United States Patent [19]

Eldred et al.

[11] 4,349,101
[45] Sep. 14, 1982

[54] CONVEYOR OF ENDLESS CHAIN TYPE WITH ECCENTRIC ARRANGEMENT TO OVERCOME CHORDAL ACTION

[75] Inventors: John W. Eldred; James B. Legg, both of Columbus; James A. Earley, Lancaster, all of Ohio

[73] Assignee: The Eldred Company, Columbus, Ohio

[21] Appl. No.: 219,887

[22] Filed: Dec. 24, 1980

Related U.S. Application Data

[62] Division of Ser. No. 10,529, Feb. 9, 1979, Pat. No. 4,263,846.

[51] Int. Cl.³ .............................................. B65G 17/06
[52] U.S. Cl. .......................................... 198/851; 59/78; 474/229
[58] Field of Search ..................... 198/830, 851, 853; 474/154, 153, 203, 211, 214, 215, 229, 231, 209; 59/78

[56] References Cited

U.S. PATENT DOCUMENTS

| | | | |
|---|---|---|---|
| 1,193,550 | 8/1916 | Hovland | 474/231 X |
| 2,142,003 | 12/1938 | Morgelin | 474/231 X |
| 3,737,024 | 6/1973 | Gelzer | 198/725 |
| 3,789,286 | 1/1974 | Towne et al. | 198/575 X |
| 4,274,536 | 6/1981 | Riegler | 198/851 |

Primary Examiner—Robert B. Reeves
Assistant Examiner—Douglas D. Watts
Attorney, Agent, or Firm—William V. Miller

[57] ABSTRACT

A conveyor of the endless chain type passing around two or more sprockets provided with means for compensating for the chordal action which ordinarily occurs as a chain passes around its associated sprocket. The chain is composed of links having overlapping portions pivoted together by pins which have eccentrics associated therewith that have sprocket-engaging surfaces. As the links move onto and off the sprockets, these eccentrics are controlled to rock relative to the pivot pins to vary the pitch of the successive links, which serve to keep the runs of the chain moving at a constant speed.

6 Claims, 42 Drawing Figures

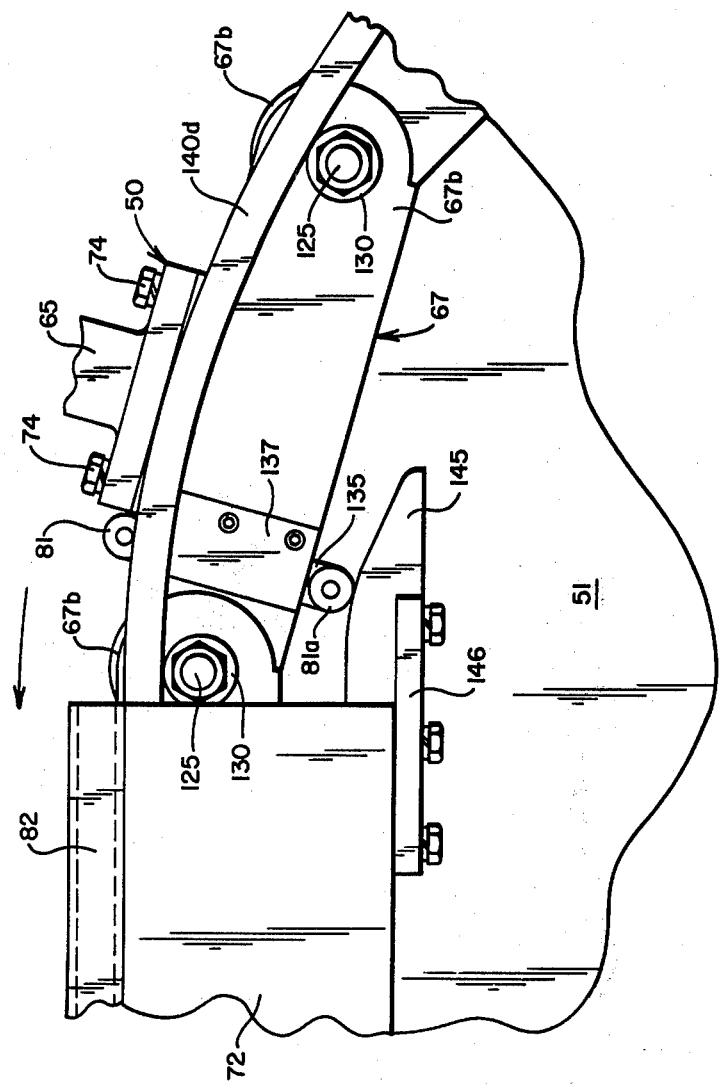

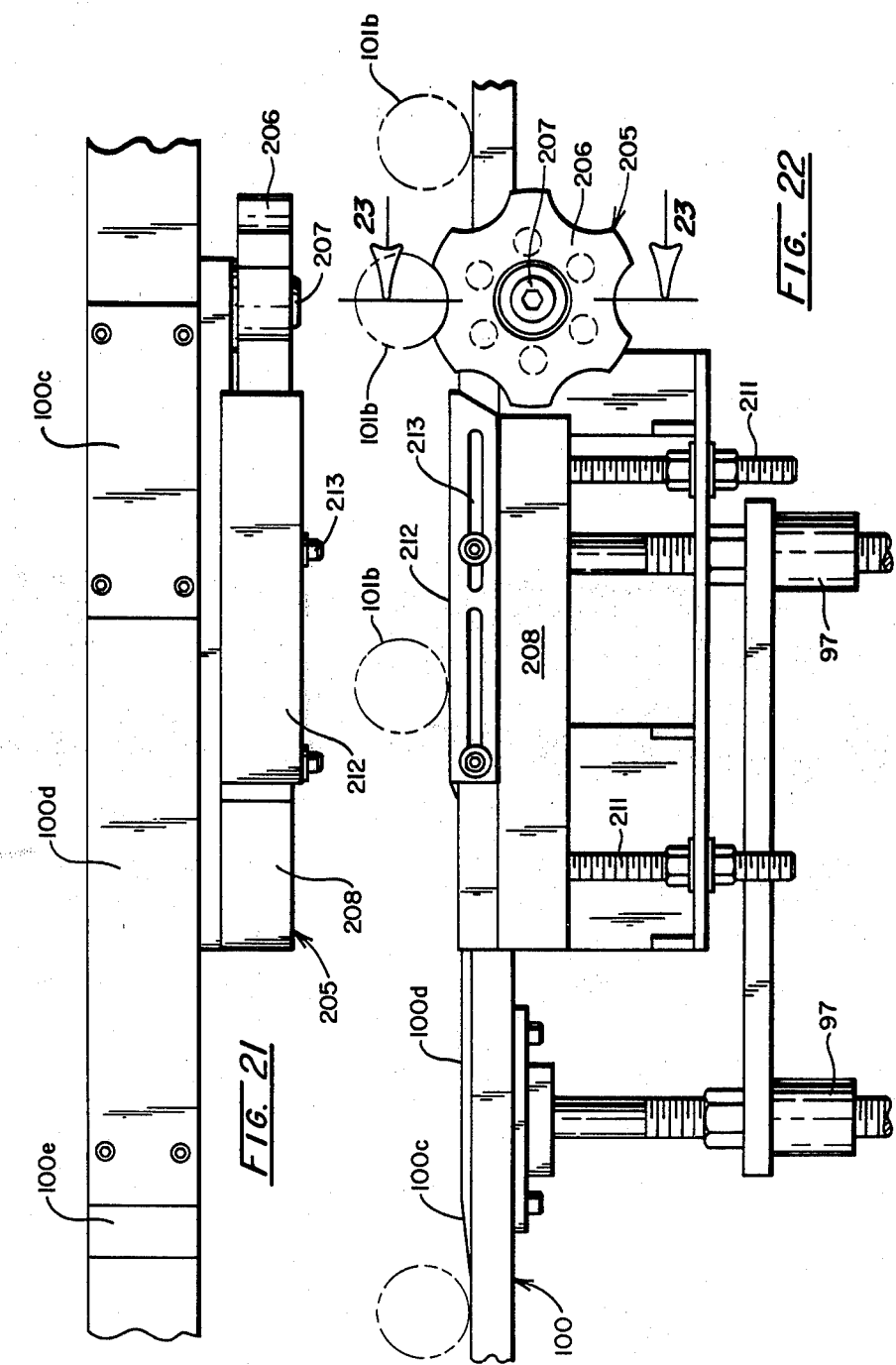

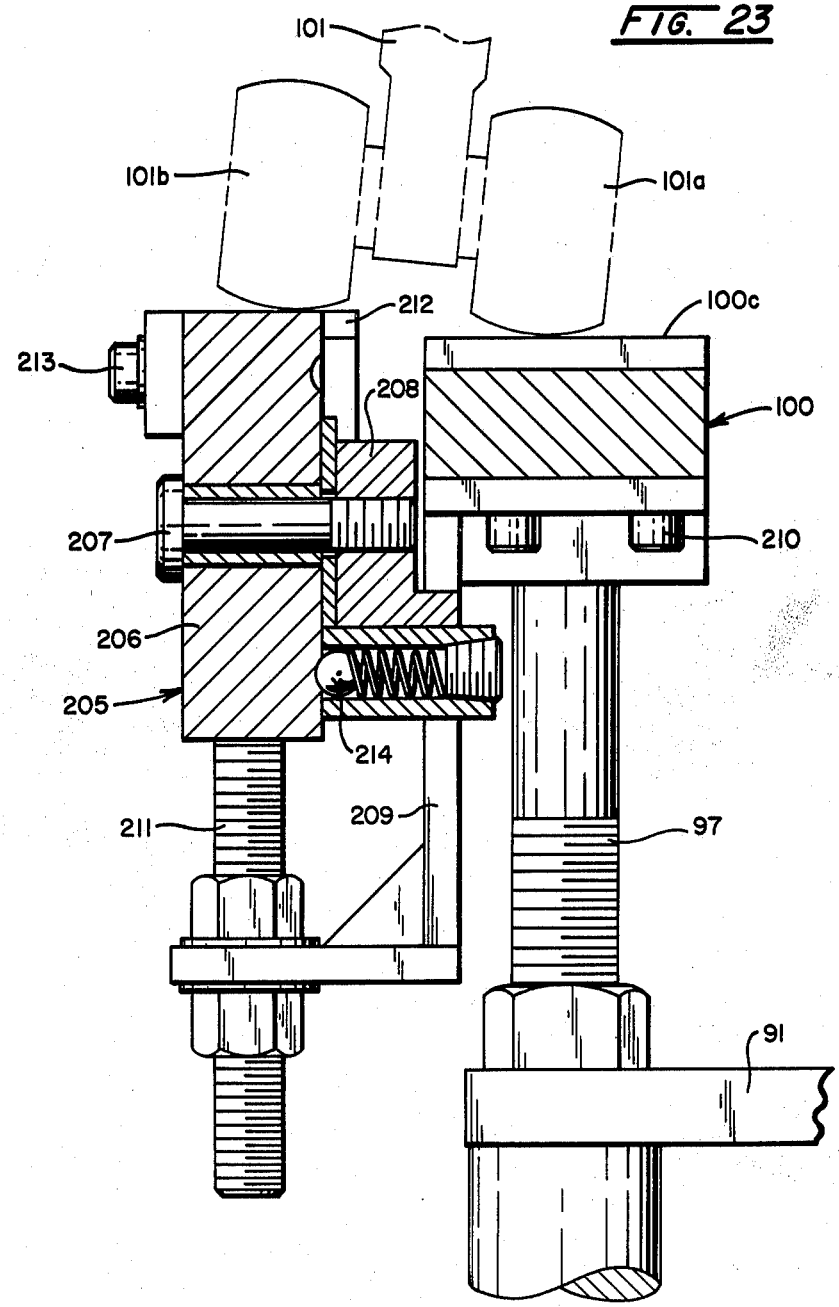

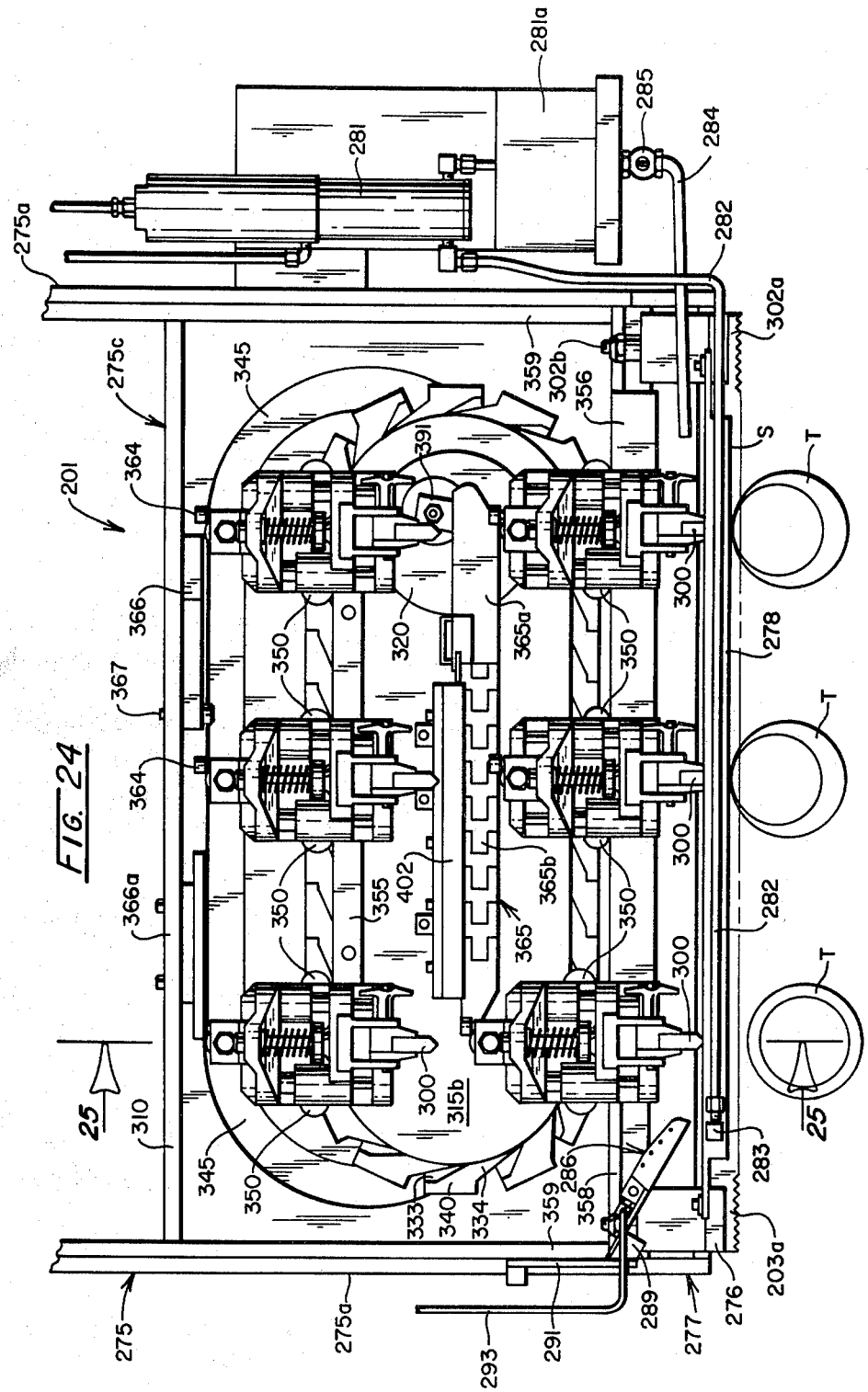

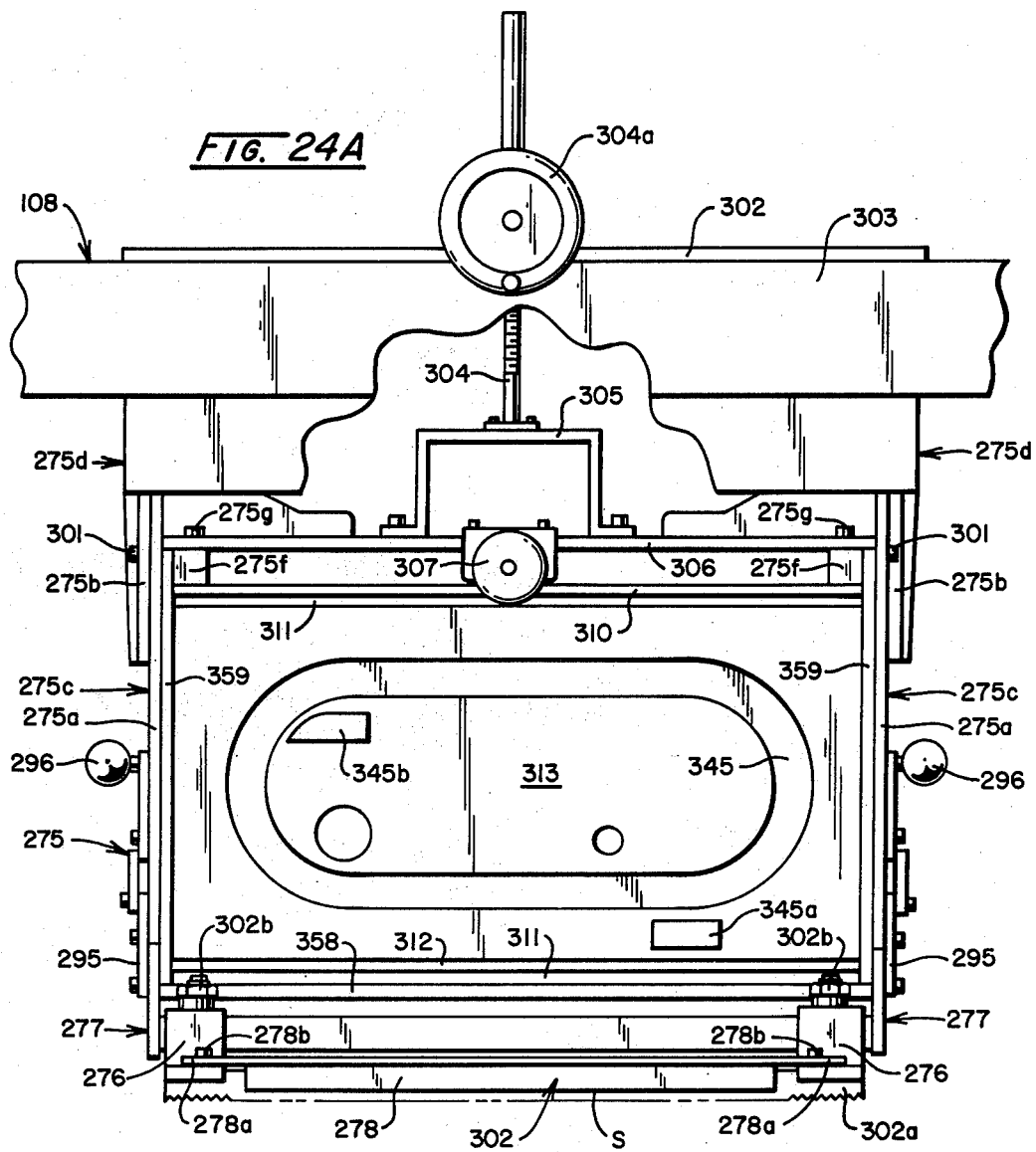

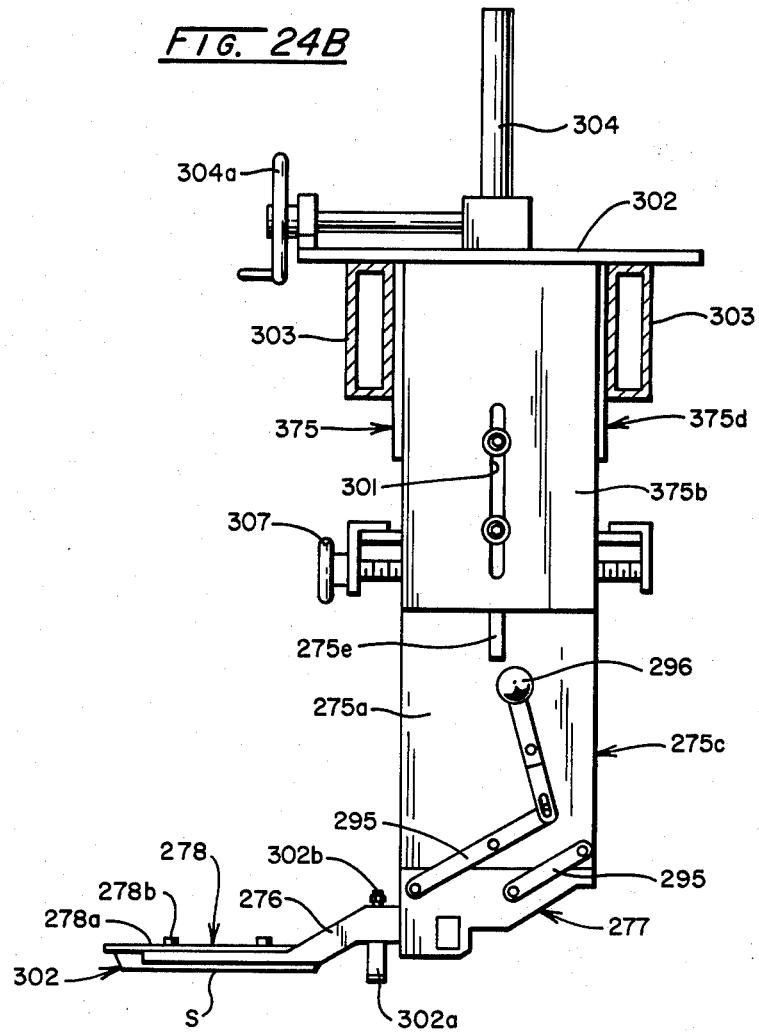

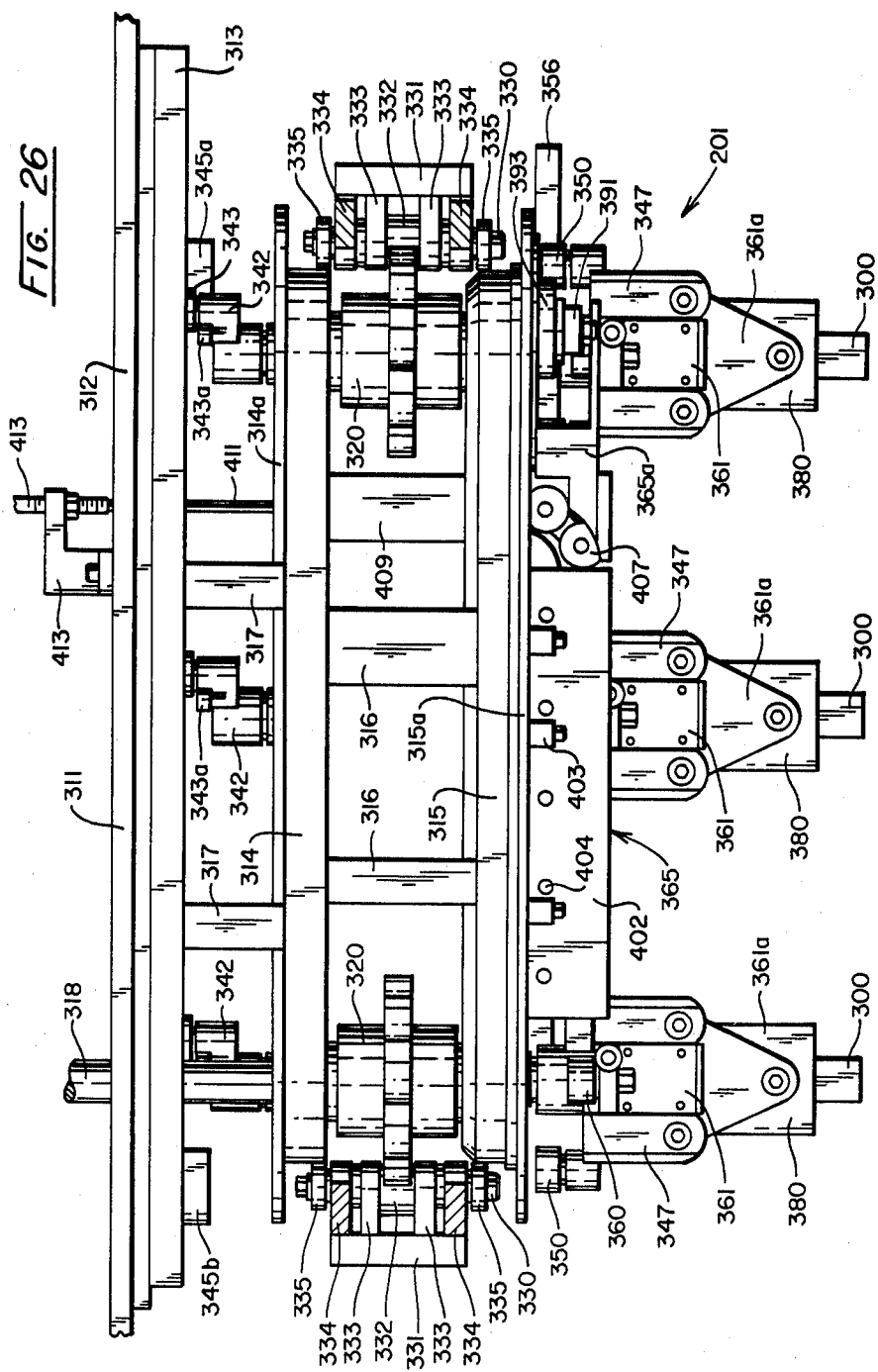

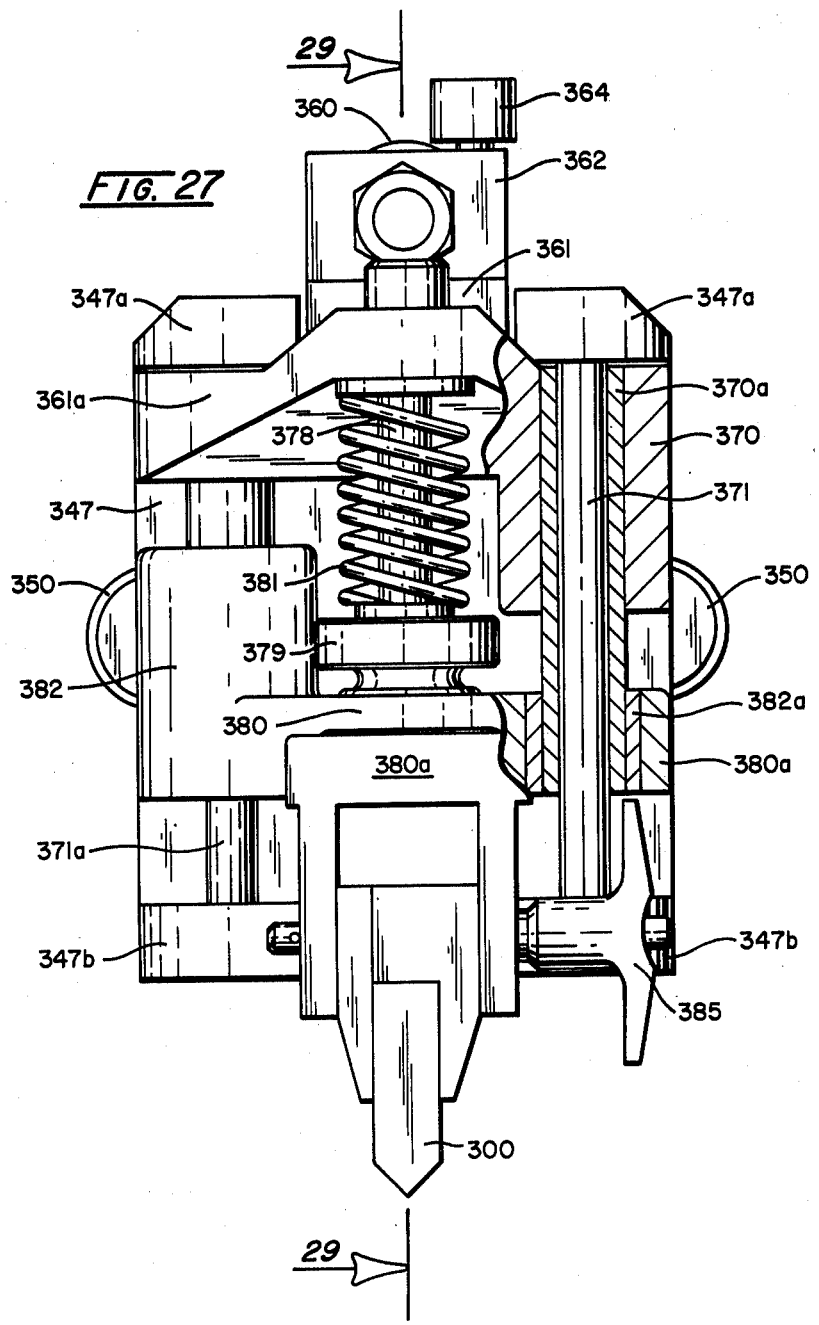

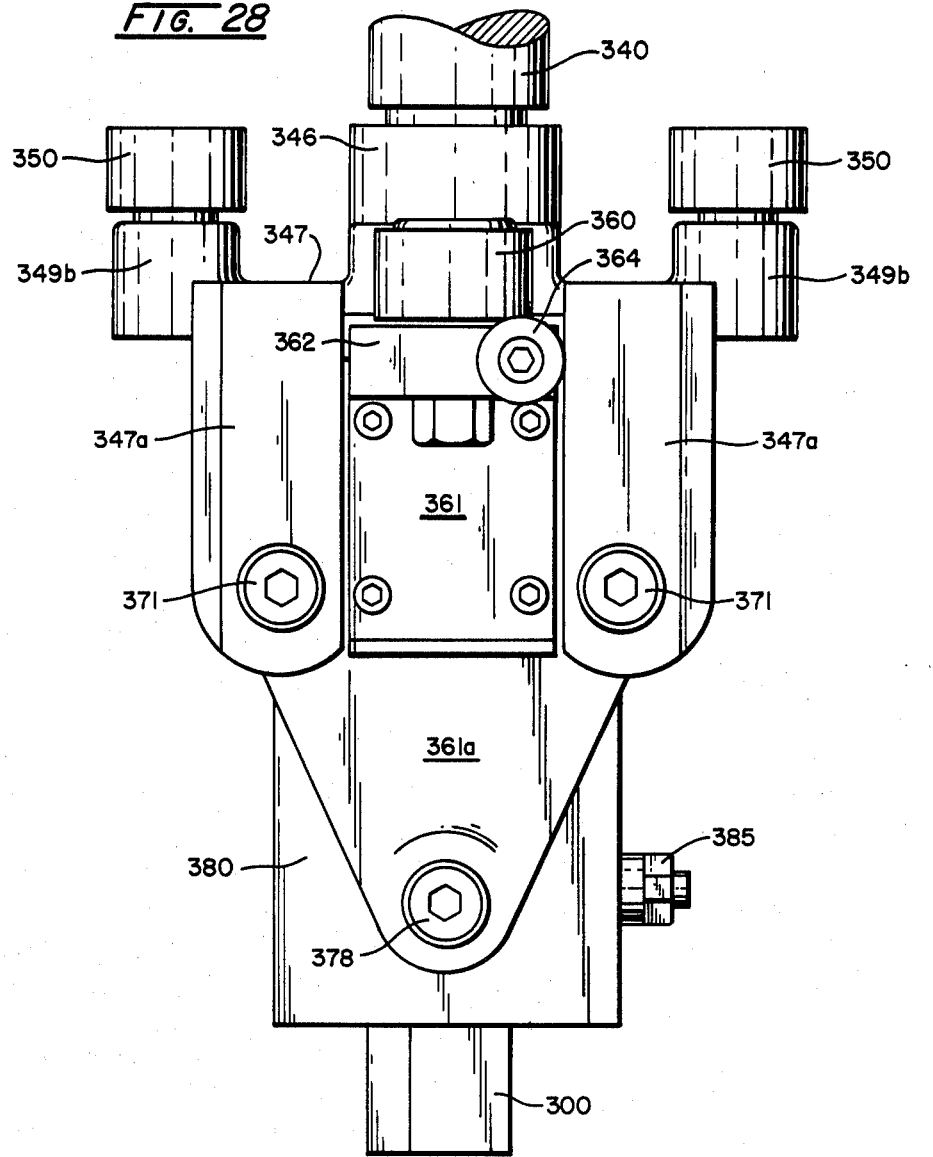

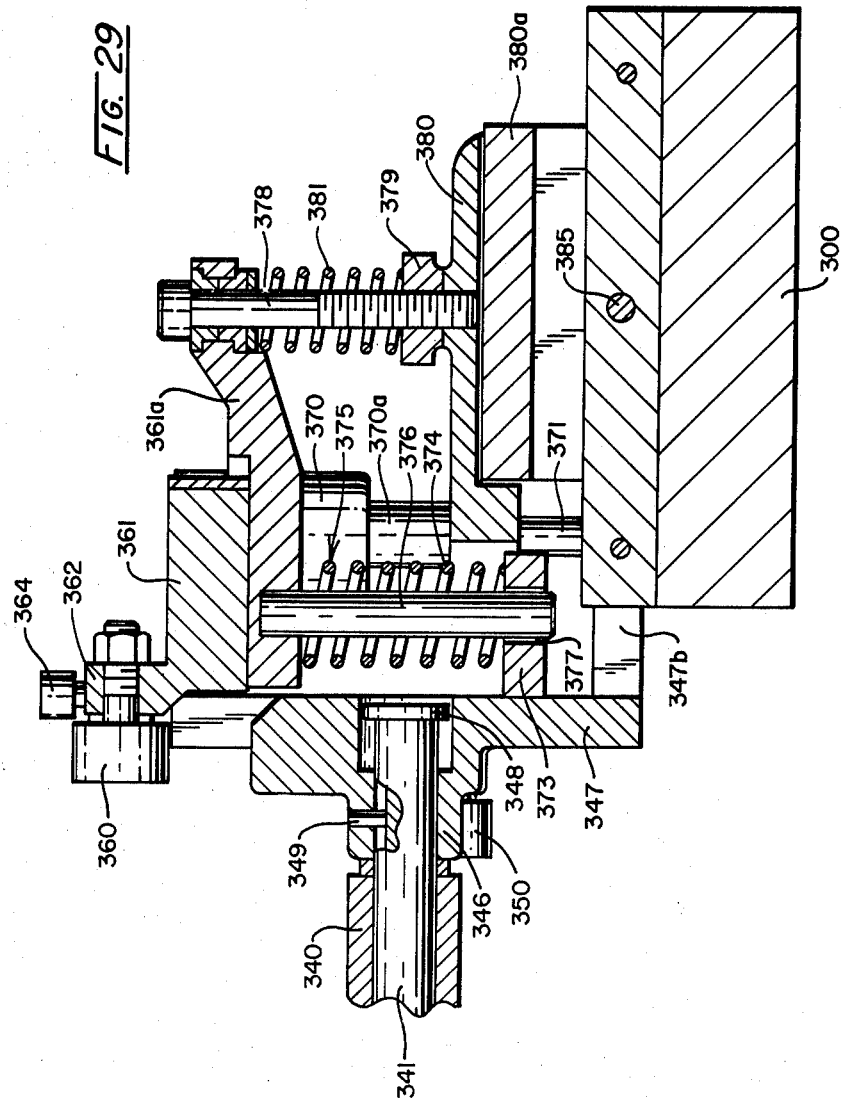

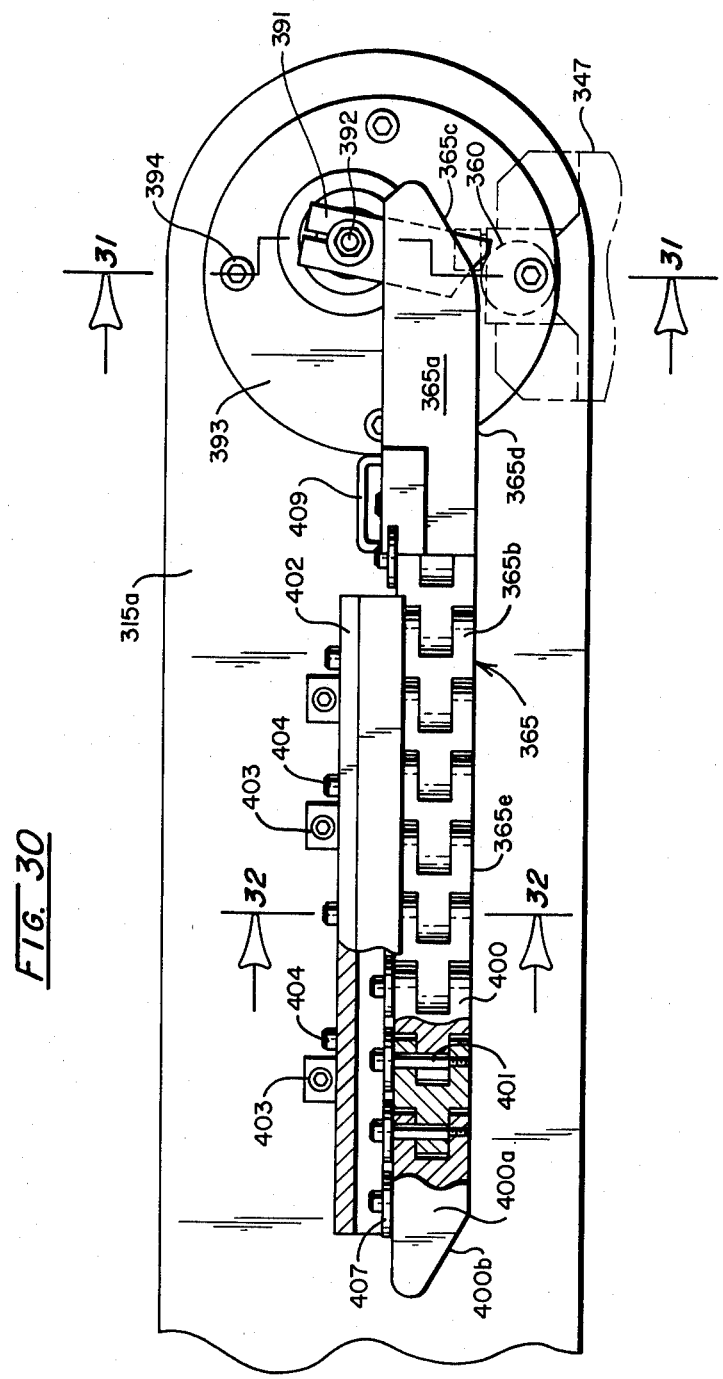

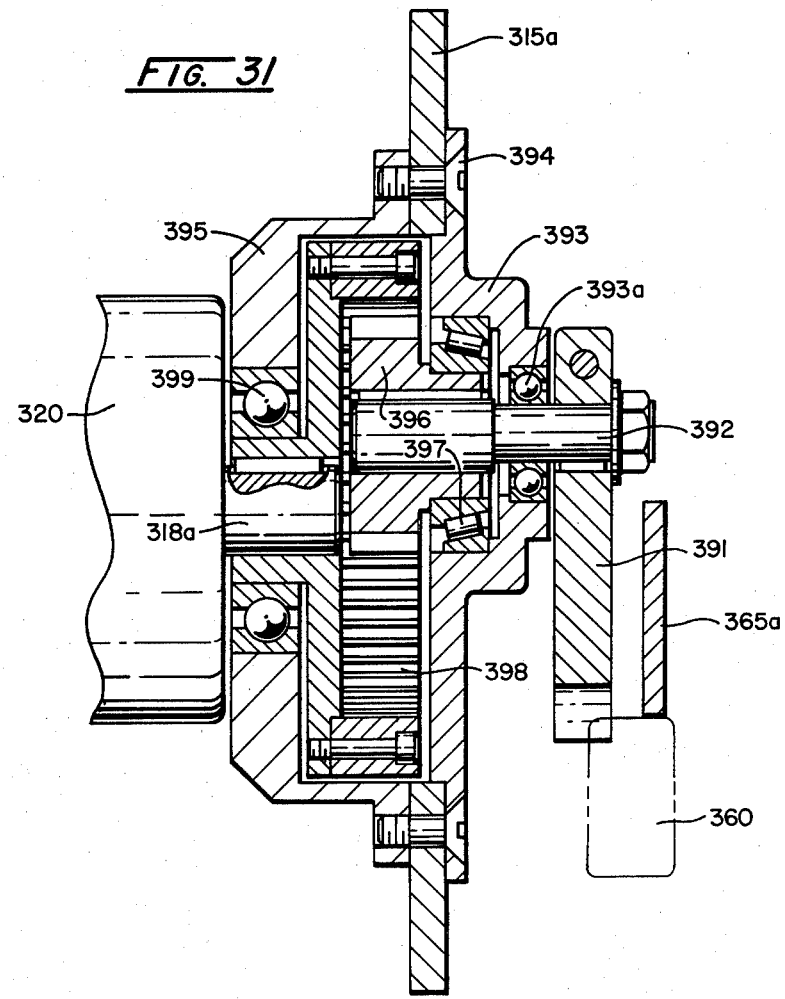

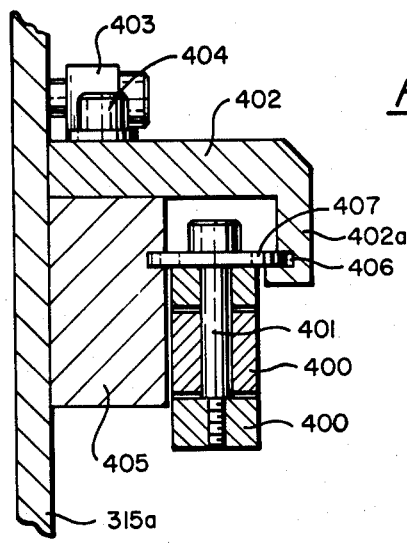
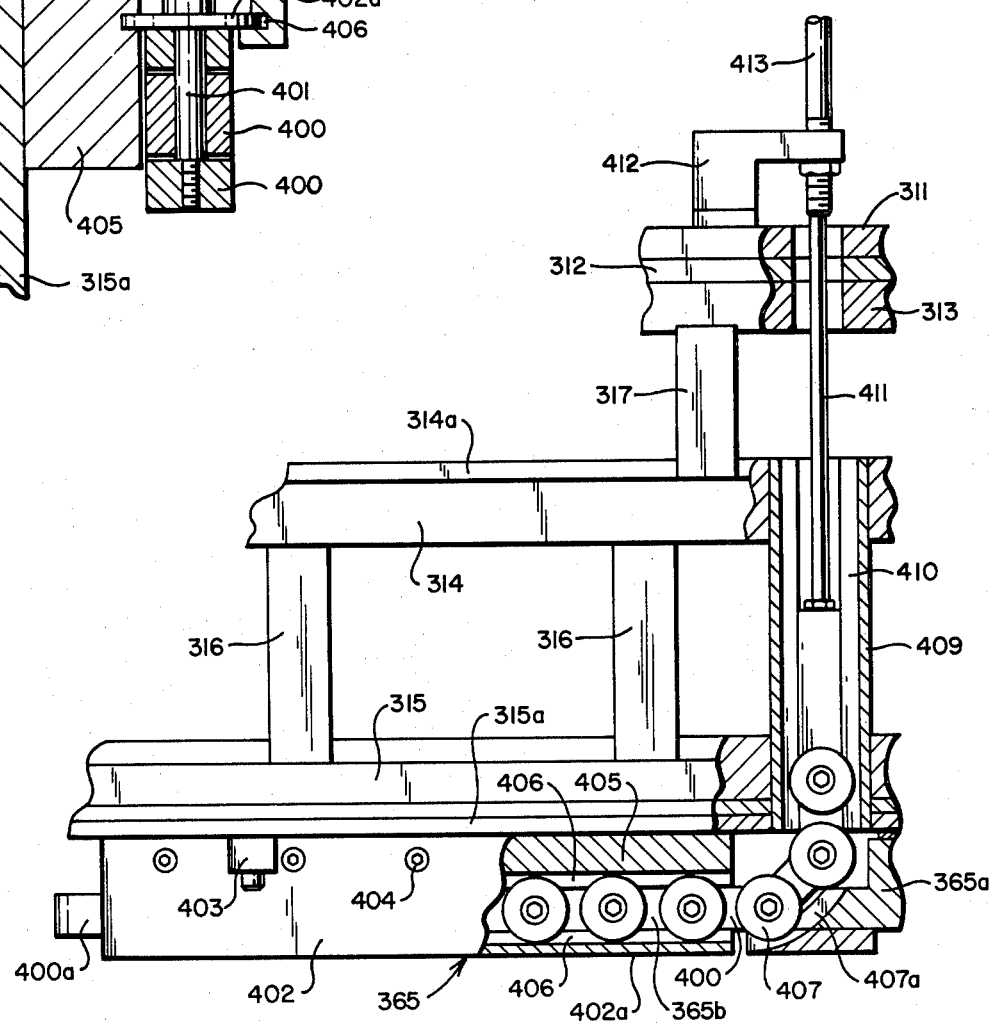

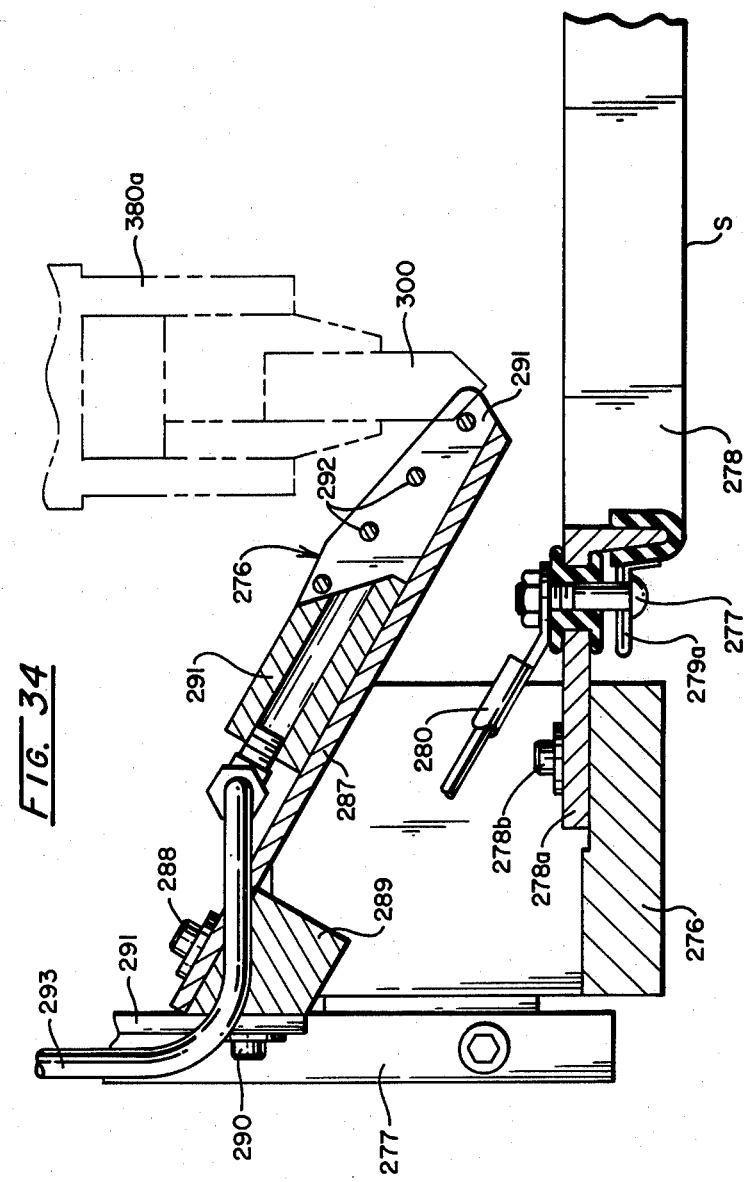

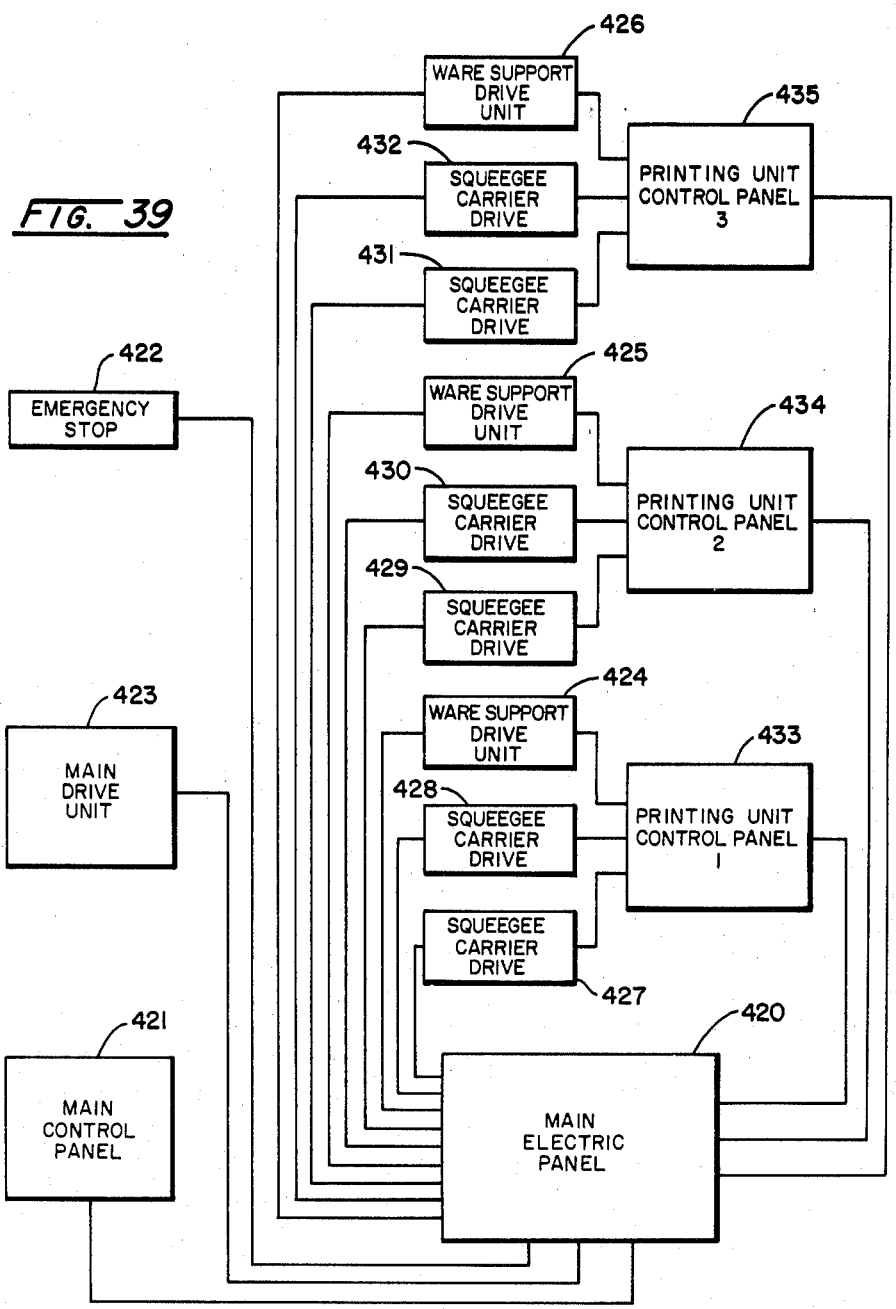

CONVEYOR OF ENDLESS CHAIN TYPE WITH ECCENTRIC ARRANGEMENT TO OVERCOME CHORDAL ACTION

BACKGROUND AND SUMMARY OF THE INVENTION

This application is a division of copending application Ser. No. 010,529, filed Feb. 9, 1979, now U.S. Pat. No. 4,263,846, issued Apr. 28, 1981.

This invention deals with a conveyor of the endless chain type passing around two or more sprockets, one of which is usually a driving sprocket. The chain consists of successive links which have overlapping portions pivoted together by pivot or hinge pins. Ordinarily, with this type of chain there is rising and falling of the speed of the runs of the chain with resulting "surging" due to the chordal action as the links pass around the sprockets. This chordal action is overcome in the present invention by having eccentrics that have sprocket-contacting surfaces associated with the pivot pins in such a manner that, as the links move onto and off the sprockets, these eccentrics are controlled to rock relative to the pivot pins to vary the pitch of the successive links and, therefore, maintain the speed of the conveyor runs constant. Several sprocket-mounted chains may be provided according to this invention which are driven independently but which are synchronized with each other. The constant speed conveyors and synchronization thereof is important especially when one conveyor carries spaced articles and the other conveyor carries spaced implements to engage the articles.

BRIEF DESCRIPTION OF THE DRAWINGS

An example of a machine which illustrates the best mode contemplated in carrying out this invention is illustrated in the accompanying drawings in which:

FIG. 9A is an enlarged partial bottom view of the main conveyor and the beam support;

FIG. 21 is a plan view of the spindle lift means at the printing station;

FIG. 22 is a side elevational view of the structure of FIG. 21;

FIG. 23 is an enlarged vertical transverse sectional view taken along line 23—23 of FIG. 22;

FIG. 24 is a side elevational view showing one of the squeegee carriers and an associated screen;

FIG. 24A is an elevational view of the squeegee carrier support frame;

FIG. 24B is a side elevational view of the squeegee carrier support frame;

FIG. 26 is a plan view, partly cutaway, of the squeegee carrier;

FIG. 27 is an enlarged and elevational view, partly cutaway, of one of the squeegee units:

FIG. 28 is an enlarged plan view of the unit of FIG. 27;

FIG. 29 is a vertical sectional view taken along line 29—29 of FIG. 27;

FIG. 30 is an enlarged elevational view of an adjustable cam means for camming the successive squeegees into engagement with the cooperating screen;

FIG. 31 is a transverse vertical sectional view taken along line 31—31 of FIG. 30;

FIG. 32 is a transverse vertical sectional view taken along line 32—32 of FIG. 30;

FIG. 33 is a plan view, partly cutaway, of means for adjusting the cam of FIG. 30;

FIG. 34 is an enlarged sectional view showing the screen heating means, and squeegee wiping means illustrated generally in FIG. 24;

FIG. 39 is a schematic block diagram of the electric control system of the machine.

DETAILED DESCRIPTION OF THE INVENTION

Figure 1:
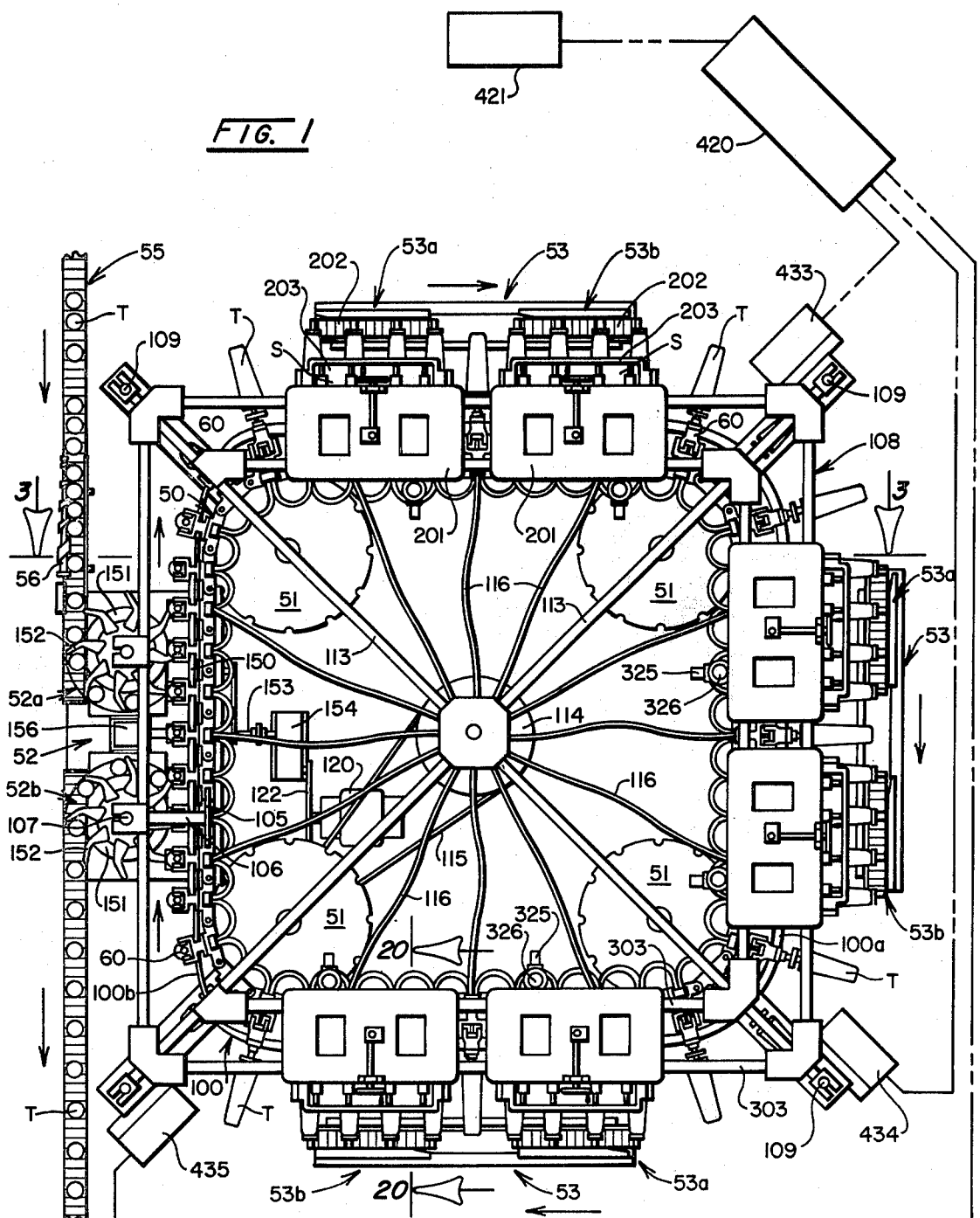
FIG. 1 is a plan view of a continuous motion decorating machine of the screen and squeegee type embodying the present invention.
Figure 2:
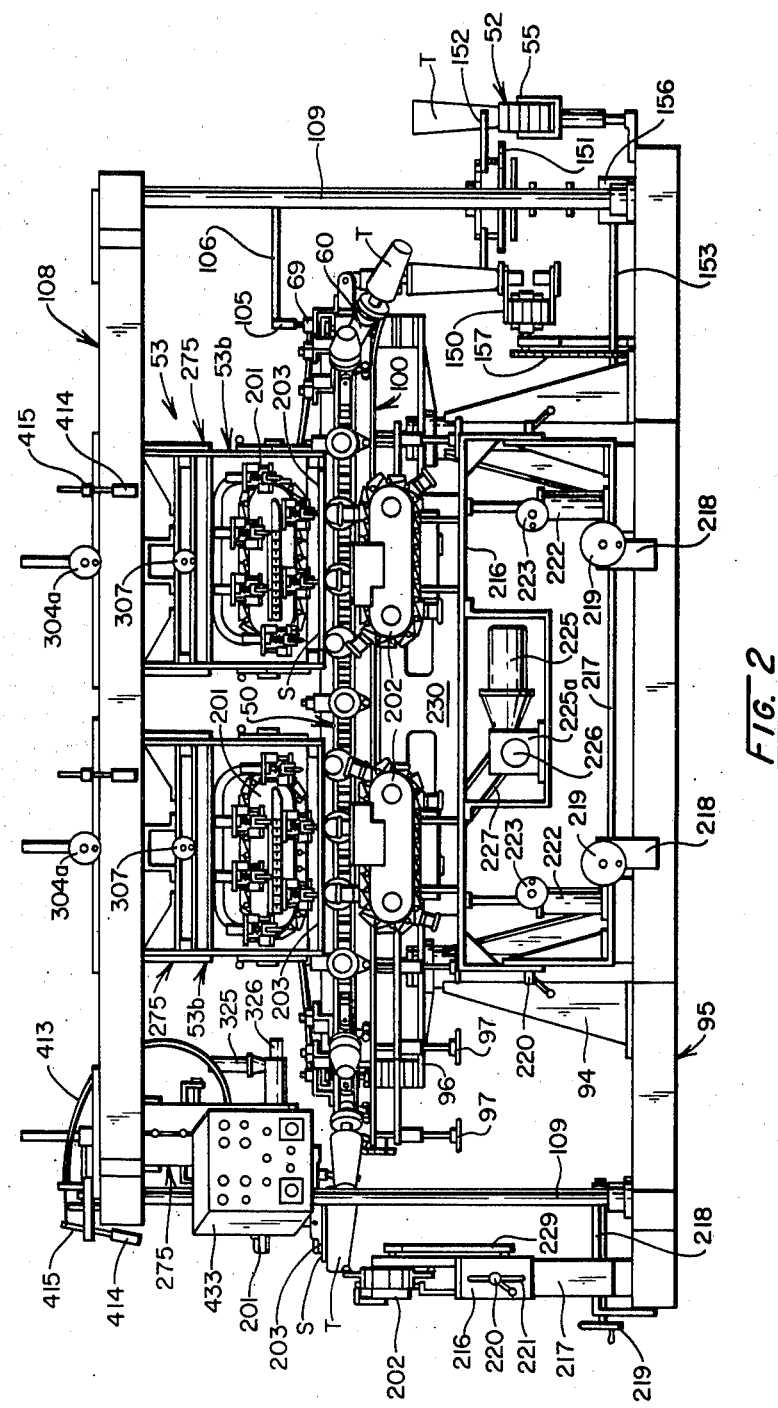
FIG. 2 is a side elevational view of the machine at one of the printing sides thereof.
Figure 3:
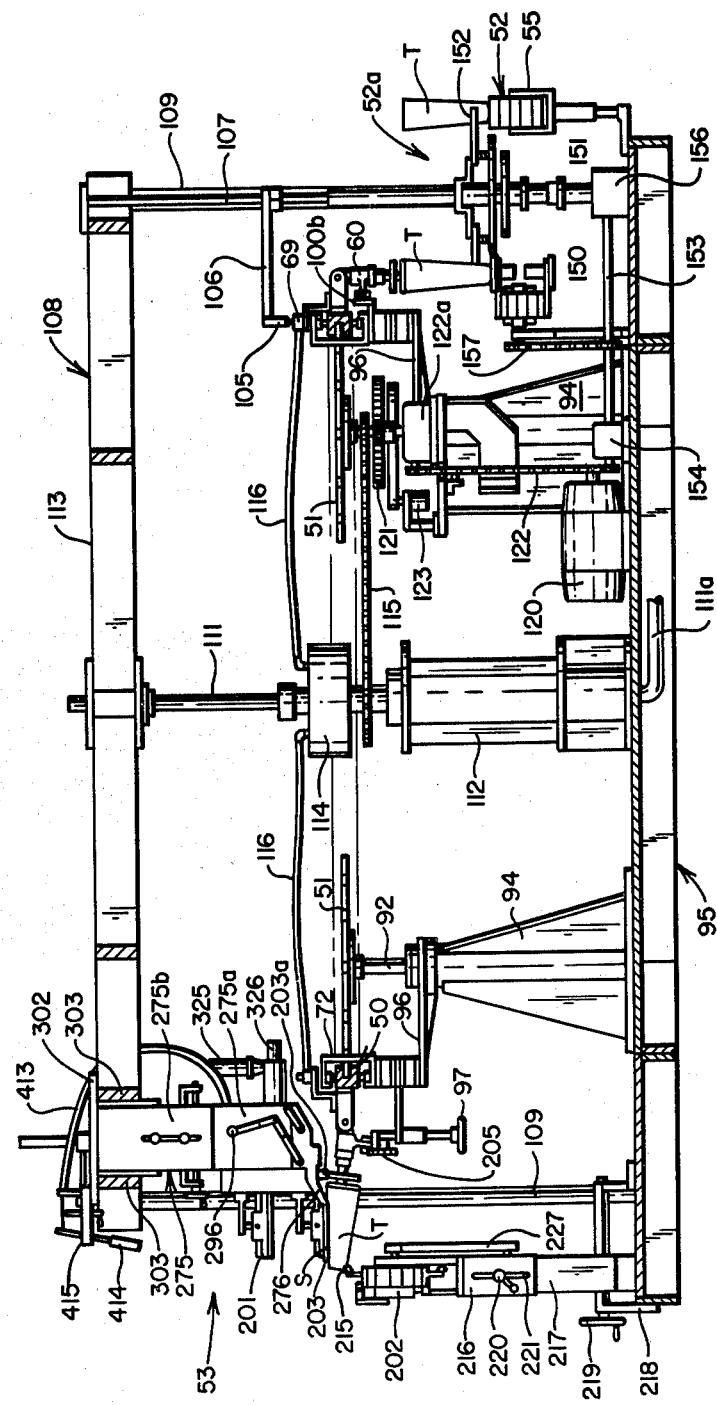
FIG. 3 is a vertical sectional view taken along line 3—3 of FIG. 1.
Figure 4:
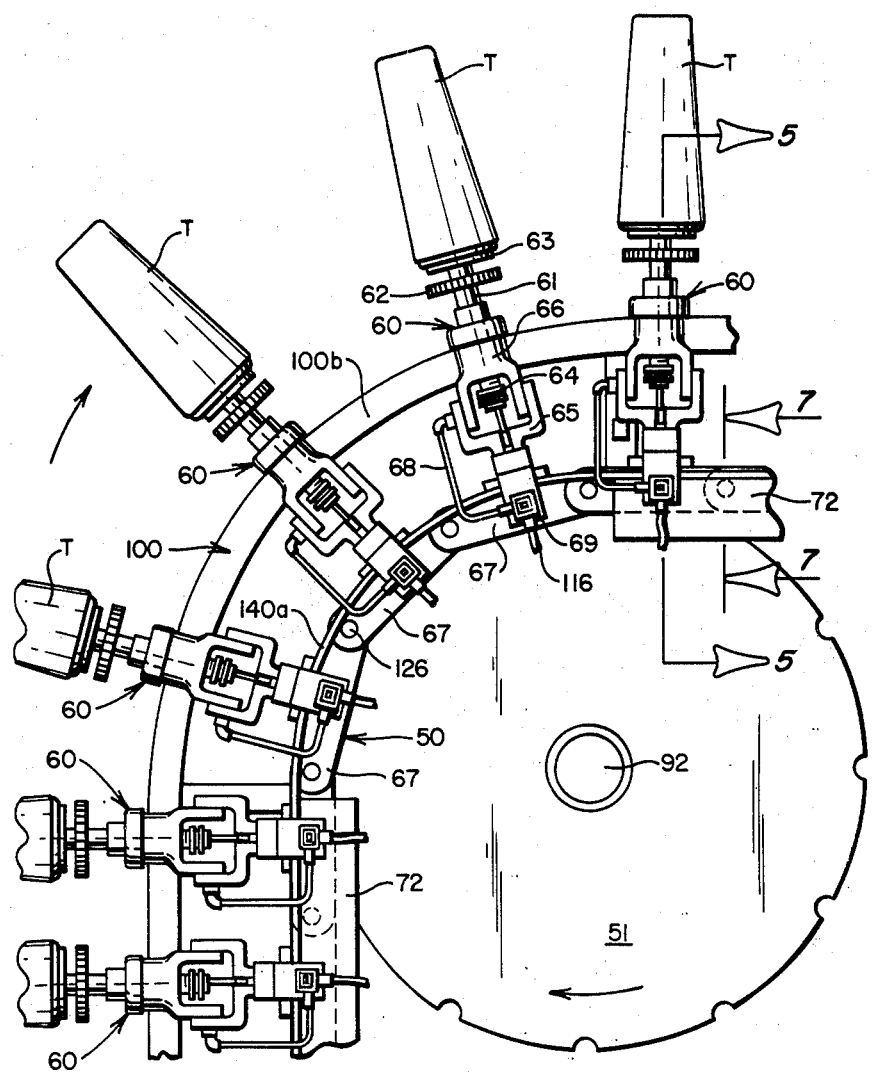
FIG. 4 is an enlarged partial plan view showing a portion of the main article carrier conveyor and a cooperating sprocket.
Figure 5:
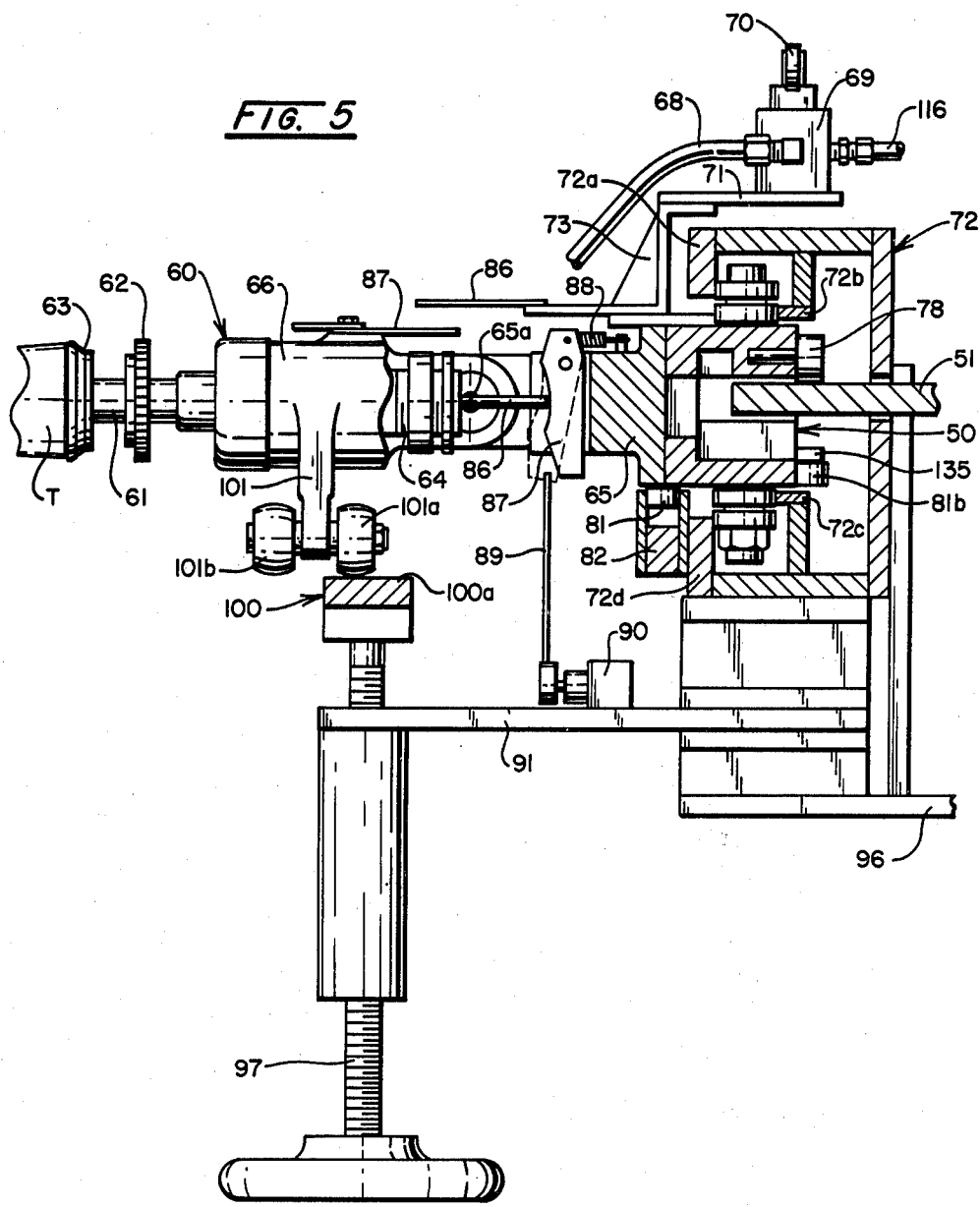
FIG. 5 is a vertical sectional view taken along line 5—5 of FIG. 4 through the main conveyor.

With specific reference to the drawings, the automatic decorating machine is an example of a machine in which this invention can be incorporated is illustrated generally in FIGS. 1 to 3. It is shown generally as including a main ware or article carrier 50 which is in the form of an endless continuously driven chain passing around four horizontally disposed sprockets 51 disposed at a suitable level, so as to be arranged in a square loop or outline. This square form is preferred in order to provide one straight side or run of conveyor, where a continuously moving loading and unloading unit 52 is located, and three other straight sides or runs where one or more printing units 53 are located. Thus loading and unloading, and printing, occurs while the ware is travelling along straight-line paths. Also, the invention is not necessarily limited to having the main conveyor or ware carrier of square outline but this outline could be varied as long as straight runs are provided for the different operations, but the square outline is usually preferred for plant layout and for reasons stated above.

As indicated, any number of printing or decorating units 53 may be provided so that multi-color designs may be printed on the ware. Each printing unit 53 includes two printing stations 53a and 53b. One of these units has been shown at each printing side of the machine for a total of six stations. Each printing station includes one color. Any one or all of these may be used at any time and the ware is carried continuously to the successive stations as it is carried around the machine by the carrier 50. The machine is designed especially for decorating articles of glassware, such as tapered tumblers, which are supplied thereto by a continuously moving delivery conveyor 55 having the usual spacing screw 56 as a part thereof. After leaving this screw, the spaced upright articles are supplied to the loader section 52a of the loader and unloader unit 52.

The loader section 52a is generally similar to the loader shown in the patent to Eldred et al., U.S. Pat. No. 3,176,824, issued Apr. 6, 1965. However, the loader of that patent was designed for loading an intermittent turret-type machine and substantial variations were made to adapt it to loading a continuous motion machine. Also, as will appear later, the unloader section 52b of the unit 52, provided for this machine, will be substantially the same and will unload the upright decorated articles onto a continuously moving take-out conveyor 57 of suitable type.

Figure 6:
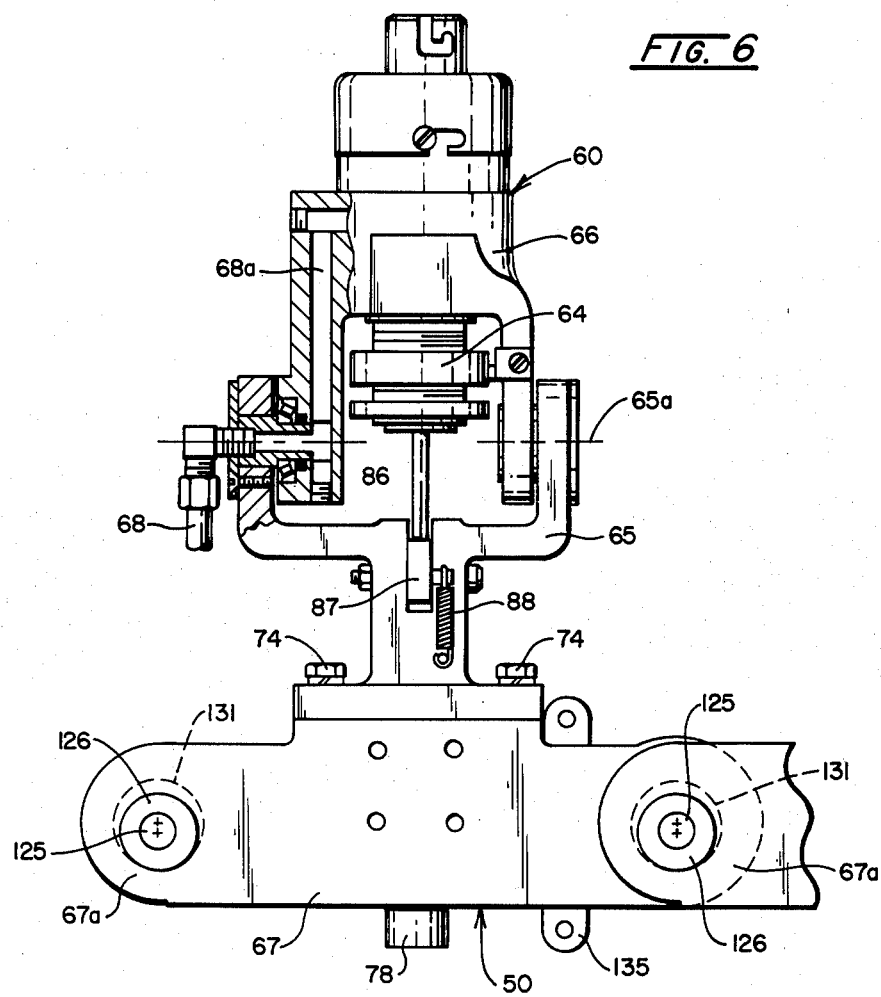
FIG. 6 is an enlarged elevational view, partly cutaway, of a portion of the main conveyor, showing mainly one chain link and the spindle carried thereby.

The ware carrier 50 is illustrated in FIGS. 1 to 11 and is adapted to carry the ware-supporting spindle assemblies 60 at longitudinally spaced intervals. These spindle assemblies are substantially like those disclosed in the patent to Eldred et al., U.S. Pat. No. 3,181,457, dated May 4, 1965. As disclosed in that patent, each spindle assembly is provided with a spindle 61 (FIG. 4) which has a gear or pinion 62 keyed thereon for rotating it and which also has a vacuum chuck 63 carried thereby for receiving and retaining a piece of ware such as a tumbler T. The gear 62 is adapted to cooperate with a rack associated with each screen, at the successive printing stations, and the gear also controls registering means which is associated therewith and is one of the type disclosed specifically in the patent to Eldred, et al., U.S. Pat. No. 3,209,688, issued Oct. 5, 1965. Registration is effected as disclosed in the latter patent by the gear 62 that rotates with the vacuum chuck 63, when the gear disengages the rack at the screen. The registering means actuated by this disengagement indicated generally at 64. Each spindle assembly 60 further comprises an inner supporting hinge bracket 65 and an outer section 66 (FIG. 5) which is hingedly connected thereto and vertically swingable about a horizontal hinge axis 65a. Each support bracket 65 is clamped to and extends horizontally outwardly from a chain link 67 of the ware carrier or main conveyor 50 (FIG. 6). The chuck 63 is connected to a continuous vacuum source through a passage 68a in the swingable section 66 and the hinge and a fixed line 68 that connects to a control valve 69 carried by a horizontal support 71, the valve being controlled by means of engagement with an upstanding stem and roller 70. The valve support 71 is disposed at a level for movement above a chain housing and support beam 72 located at each side of the machine within the straight runs of the ware carrier 50 and extending between sprockets 51. The support 71 is carried by an upward bracket extension 73 supported by the bracket 65. The bracket 65 is bolted to the outer side of a chain link 67 (FIG. 6) by means of bolts 74. Each chain link 67 carries a horizontal axis roller 78 at its inner side for supporting and positioning the chain within the beam 72, this roller rolling on the upper surface of each sprocket 51 and a support flange 80 (FIG. 7) within the beam and extending substantially its length. The chain link is also provided with a depending roller 81 which operates in a guide 82 that is attached to and extends along the outer side of each beam 72 at its lower edge. Supports 73 and swingable spindle sections 66 carry guard plates 86 and 87, respectively, which overlap when sections 66 are horizontal and in printing position to protect the spindle assembly hinges from excess paint. The spindle assembly section 66, as in patent U.S. Pat. No. 3,181,457, is provided with a valve for controlling the vacuum chuck 63 thereof and this includes a projecting stem 86, the position of which depends upon whether or not there is a tumbler in position on the chuck at the loading position. This stem cooperates with a cam lever 87 which is pivoted to the bracket 65 and is held in engagement with the stem by a spring 88. This lever controls a push rod 89 which operates a switch 90 that is supported by a plate 91 at a fixed level adjacent the beam 72. This switch will control the positioning of the squeege-carrier relative to its associated screen so that the squeeges only wipe over the screens when articles to be decorated are positioned thereberneath. This rod is located near the beginning of each printing station and if no article is on the chuck, the lever 87 will move into dotted position and contact the rod 89, as the spindle assembly moves into printing position, so as to prevent movement of the squeeges into contact with the screen.

The four sprockets 51 for the carrier 50 are carried by vertical shafts 92 which are supported by standards 94 (FIGS. 2 and 3) upstanding from the main support base 95 of the machine. These standards also support the brackets 96 which carry the chain housing and support beam 72 and the horizontal plates 91. These plates 91 (FIG. 5) carry at their outer ends the vertically adjustable jack screws 97 which support the cam rail or track 100 which extends around the machine and cooperates with cam rollers 101a, carried by dependent brackets 101 at the lower sides of each swingable spindle sections 66, for controlling their positions about their hinge connections 65a to the brackets 65 of the spindle assembly 60. The track is of substantially square outline and is adapted to swing the spindle sections 66 about the hinge axes 65a from vertically-dependent positions, at the loader and unloader 52, to horizontal outwardly-extending positions at the printing units 53. The rail will be supported substantially the same as disclosed in U.S. Pat. No. 3,096,709 and will gradually twist to provide a horizontal roller-engaging surfaces 100a (FIGS. 1 and 5), when the section 66 is to be horizontal, and a vertical roller-engaging surface 100b when it is to be in dependent vertical position. The cam rail 100 can be adjusted vertically by the screws 97 to position it so as to accurately locate the spindle sections 66 at the proper levels for the printing operations. The bracket 101 also carries a second roller 101b which is used in lifting the tumbler T against the screen.

The vacuum control valves 69 move with carrier 50 and the vacuum is cut-off and atmospheric or additional air pressure applied when the unloader section of the unit 52 is reached. This is accomplished by a cam 105 (FIGS. 1 to 3) which is successively engaged by the valve stems 70 as the tumblers T move toward unloading position. This cam 105 (FIG. 3) is carried on the inner end of an arm 106 supported by a post 107 extending between an upper horizontal frame 108 and the base 95. The frame 108 is supported at the desired level from the base 95 by means of the four corner supports 109 (FIGS. 1 to 3). Located at the center of the base and extending upwardly to the level of the top frame 108 is a central column 111 which is supported from the base 95 by a standard 112. The upper end of the column 111 is braced by diagonal braces 113 extending from the four corner supports 109. A vacuum manifold 114 is mounted for rotation on the column 111 and is driven by a chain and sprocket drive 115 from the main drive for one of the sprockets 51. The column 111 is connected to the source of vacuum, through line 111a, into manifold 114. Manifold 114 is connected by the flexible lines 116 to the respective valves 69. The main drive for this sprocket 51 includes an electric motor 120 (FIG. 3) on the base 95 which continuously drives a gear train 121, through a chain drive 122, and gear box 122a. An electronic synchronizer or resolver unit 123 is connected to motor 120, through gear train 121, chain drive 122, and gear box 122a. This unit and others used in the various drives of this machine may be of a suitable type but one manufactured by Contraves Goerz Corporation has been found suitable. Another suitable system is supplied by Controls System Research.

The endless conveyor chain of the spindle carrier 50 is so constructed, as are all the other endless chains in the machine, that the effects of chordal action are eliminated and, therefore, accuracy in printing the designs on the tumblers T, and especially in registering successive colors or designs, is obtained. Chordal action in a conventional chain, with the usual pivot or hinge joints, is the variation in chain velocity as it passes onto and off the sprocket. In this machine, the chordal action is compensated for by providing special eccentric pivot pin arrangements, as illustrated best in FIGS. 6 to 11, inclusive.

Figure 7:
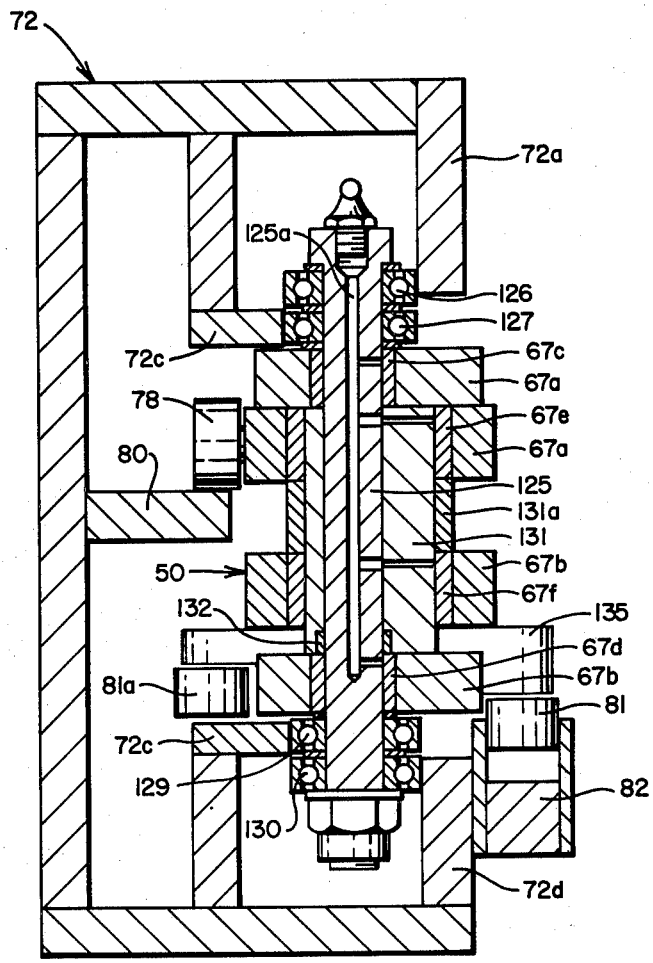
FIG. 7 is a vertical sectional view taken along line 7—7 of FIG. 4 through the main conveyor chain and the beam support.
Figure 8:
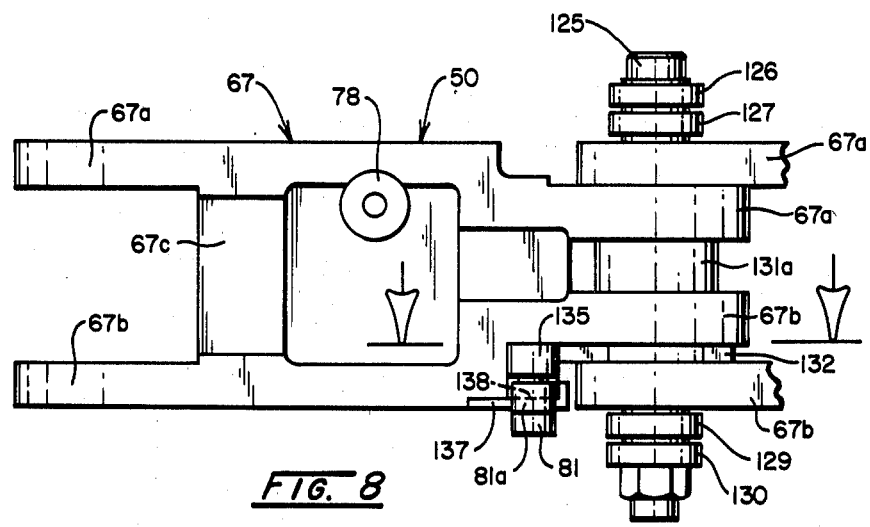
FIG. 8 is a side elevational view of a link of the chain.
Figure 9:
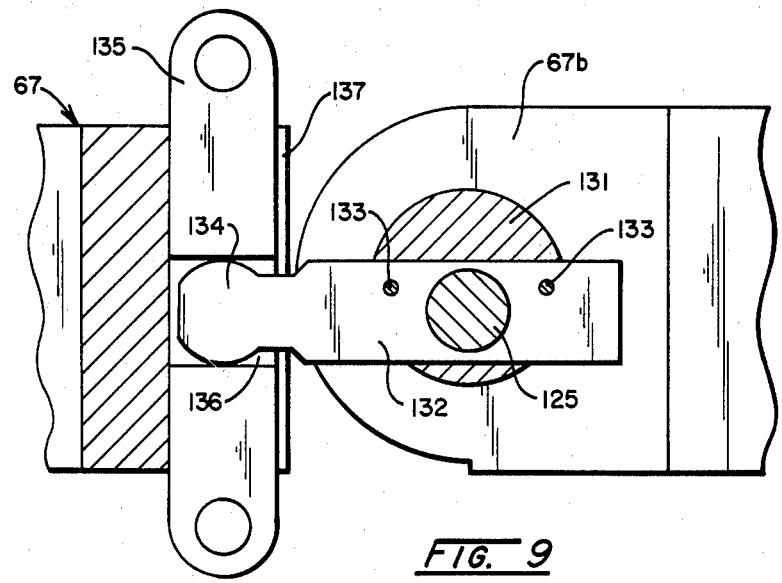
FIG. 9 is a horizontal sectional view taken along line 9—9 of FIG. 8.

Each chain link 67 comprises an upper horizontal bar 67a and a lower horizontal bar 67b, joined by a vertical web 67c, which are shaped to provide widely and narrowly spaced opposed ends so that any one link interfits with similarly shaped leading and trailing links (FIGS. 7 and 8). A vertical pivot or hinge pin 125 connects these overlapping ends pivotally together. The upper end of this pin, above the bar 67a, carries superimposed anti-friction rollers 126 and 127. The roller 126 engages with depending flange 72a, at the outer side of the beam 72, whereas the roller 127 engages with the outer edge of a horizontal flange 72b supported at the proper level from the top wall of the beam, both of these flanges extending the full length of the beam and serving as a straight guide for the chain. Similarly, the pin 125 carries, at its lower end below the bar 67b, the superimposed anti-friction rollers 129 and 130, the roller 129 engaging the edge of the horizontal flange 72c supported at the proper level from the lower side of the beam 72, and the roller 130 engaging the flange 72d, upstanding from that lower side, and which also carries the roller guide 82. The uppermost and lowermost bars 67a and 67b have bushings 67c and 67d fitted therein which engage pin 125, and the adjacent overlapping bars 67a and 67b, of adjacent links, have the bushings 67e and 67f, which engage eccentric 131. The eccentric 131 is rotatable within the bushings 67e and 67f. Bushing 131a, fitted on the eccentric 131, engages with the sprockets 51. Thus, one end of each link 67 is pivoted on the pin 125 through bushings 67c and 67d and the other end is pivoted on the eccentric 131 through bushings 67e and 67f. The bushing 131a serves as a sprocket-engaging or contacting surface on the eccentric 131. The pin 125 has a lubricant passage arrangement 125a for the eccentric 131, the pin, and the various bushings. Fixed by pins 133 to the lower end of the eccentric 131 is an oscillating arm or lever 132 (FIG. 9) which swings about the pin 125. This arm extends inwardly over the adjacent bar 67b and has a spherical end 134 which fits into a socket 136 in a slide 135. This slide 135 is mounted in a transverse guideway on the bar 67b provided by an inverted L-shaped clip 137 (FIG. 8), attached to the lower surface of bar 67b, which slidably supports the slide, in cooperation with a transverse shoulder 138 on the bar. One end of the slide has a depending portion which carries the roller 81 previously mentioned and the other end carries a roller 81a at a slightly higher level. The roller 81 cooperates with the guide 82, extending along the beam 72 as previously indicated and the roller 81a is adapted to cooperate with cam 145 located at the entering end of beam 72 (FIG. 9A). Cam 145 is provided on a support 146 on the end of the beam 72, for engaging the rollers 81a so as to return the slides 135 and, therefore, the eccentric 131, when necessary, to their original positions and to cause the rollers 81 to align with and enter the guides 82 and keep the eccentrics 131 in normal position during straight-line travel.

Figure 10:
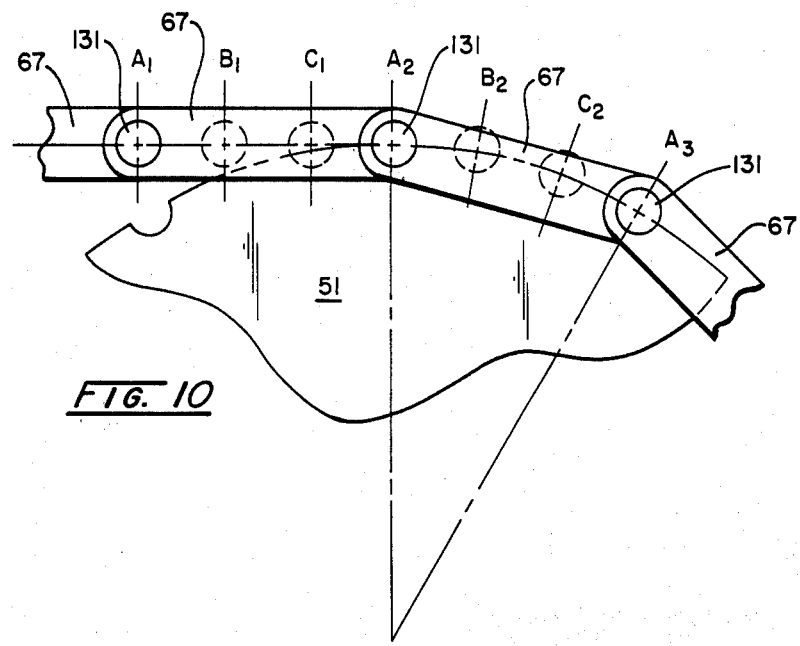
FIG. 10 is a schematic view illustrating the action of the means for compensating for chordal action of the chain.
Figure 11:
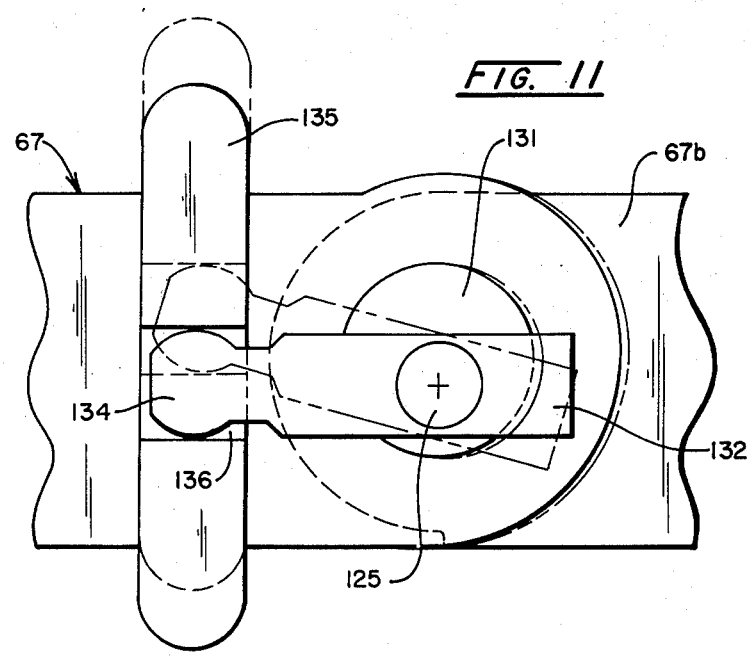
FIG. 11 is a schematic view illustrating the action of the eccentric means associated with each chain link pivot to compensate for the chordal action.

The function of this eccentric arrangement is illustrated schematically in FIGS. 10 and 11. In FIG. 10, the links 67 are shown pivoted together with the eccentrics 131 at the pivots, and passing from a straight run into and around one of the sprockets 51. It is important in the machine of this example to keep the speed of the carrier or chain 50 constant for accuracy in printing and the eccentric arrangement described prevents rising and falling of the speed of the chain with resulting "surging". As the roller or eccentric bushing 131a at the leading edge of the link is engaged by the sprocket 51 to start it around the sprocket, the speed is maintained constant by pivoting of the eccentric 131 on the pin as it travels through about the first thirty degrees. As the leading (pivoting) eccentric 131 enters into the sprocket, its direction changes from a straight-line motion to a circular or arcuate motion. This is indicated by a comparison of the successive positions of eccentric 131 indicated in FIG. 10. The straight-line motion is indicated at positions A1, B1, C1, and at A2 the arcuate motion starts. During travel from A2 to A3, the roller travels in an arc corresponding to that of the sprocket 51 and it moves farther than it would if the travel was along a straight line corresponding to the chord of the arc. Thus, for a particular distance while the roller passes around the arc of the sprocket, it moves farther than it would move in a straight line or along the chord of the arc. Therefore, the leading link, travelling around the sprocket, pulls the trailing link, travelling in a straight line, a greater distance than it would normally be pulled if the leading roller was still moving in a straight line. This would cause "surging" in the chain if the eccentric arrangement was not provided on this machine. The present invention compensates for this, pulling the trailing link farther in the same length of time by the leading link as it passes around the sprocket, by gradual pivoting of the eccentric 131 in the manner indicated in FIG. 11. The gradual pivoting of the eccentric, associated with the lead roller, lengthens the distance between it and the trailing roller so the trailing roller's speed is constant. With this eccentric arrangement, the chordal distance between A2 and A3 is the same as the straight-line distance between A1 and A2.

The pivoting of the leading eccentric 131 is controlled by guidebars 140a and 140d (FIGS. 4 and 9A), which are extension of the beam flanges 72a at 72d, and the sprocket 51. The eccentric 131 is held in the sprocket 51 by the guide bar 140a on the top roller 126 and by the guide roller 140d on the bottom roller 130. The eccentric 131 floats freely when engaged with sprocket 51 and is controlled by roller 81 previously mentioned only while in the roller guide 82. The eccentrics 131 will rotate automatically to vary the pitch of the chain links 67 as they pass around the sprockets 51.

Thus, the carrier 50 will serve to carry the spindle assemblies 60 to the various operating units 52 and 53 at a constant speed even though the chain is passing around the various sprockets 51. The effect of the chordal action on the chain is substantially eliminated so that constant speed of movement of the tumblers T is maintained with resulting printing accuracy. During this continuous constant speed travel in a clockwise direction (FIG. 1), around the machine, the tumblers T are moved from vertical upright position, at the loader section 52a of the unit 52, to horizontal position at the successive printing units 53, and then back to vertical upright position at the unloader section 52b.

The loader and unloader 52, as previously indicated, is disclosed generally in U.S. Pat. No. 3,176,824. With the present machine, two sections 52a and 52b, similar to the one loader section disclosed in the patent, are provided, one for loading and the other for unloading. The loader section 52a is disposed between the continuously moving delivery conveyor 55 and the adjacent straight line run of the article carrier 50, whereas the unloader section 52b is disposed between the continuously moving takeout or unload conveyor 57 and that run of the carrier 50. However, between these two sections 52a and 52b and the carrier 50 there is provided an additional continuously moving load or unload lift conveyor 150 shown in FIGS. 1, to 3 and 12 to 18. It will be noted (FIGS. 2 and 3) that the loader and unloader sections 52a and 52b, and cooperating conveyors, are at a lower level than the main ware carrier or conveyor 50 of the machine.

Each of the sections 52a and 52b, as disclosed in said patent, includes a rotatable carrier or disc 151, which is driven continuously and carries the pivotally mounted article-engaging fingers 152. These fingers are cam-controlled so that they engage the upright articles T and are disengaged therefrom at the proper intervals. In the loader section 52a, they will move the articles from delivery conveyor 55 to the load and unload conveyor 150, whereas in the unloader section 52b, they will move the articles to the conveyor 57. Both of the discs 151 and conveyor 150 are continuously driven by a drive shaft 153 (FIGS. 1 to 3) running from a gear box 154, on the base 95, which is driven from the main drive motor 120 by a chain drive 122. Drive unit 154 drives the gear box 156, located between the two discs 151, and a chain drive 157 which runs vertically from the drive shaft 153 to the conveyor 150. Thus, the conveyor 150, and the loader 52a and unloader 52b are mechanically timed with the main ware carrier 50.

The construction of the conveyor 150 is illustrated best in FIGS. 12 to 18. It consists of a pair of laterally spaced, horizontally disposed support beams 160 secured together in spaced parallel relationship by transverse web members 161. The beam structure is supported towards its ends from the machine base by a pair of telescoping post structures 162 beneath the inner beam 160. A jack 163, supported on the machine base intermediate the posts 162, is provided for vertically adjusting the conveyor support beam structure. As previously indicated, the conveyor 150 is supported just within and tangentially to the loader and unloader sections 52a and 52b and between them and the adjacent straight run of the ware carrier 50. Its upper run is adapted to be located at the level of the loader and unloader discs 151 and can be so located accurately by the adjustable jack or post 163.

The conveyor 150 itself comprises an endless chain formed of links 165 which are pivoted together by transverse pivot pins 167 (FIG. 18) for travel in a vertical plan around a pair of longitudinally spaced, transverse, horizontally disposed sprockets 166. Each sprocket is supported by a transverse shaft 166a journalled in bearings 168 adjacent the ends of the support beams 160. The one drive sprocket 166 (FIG. 13) is keyed to the cooperating shaft 166a and projects to carry a pinion of a gear drive 157a which is driven by the chain drive 157. The ends of the pivot pins 167 project laterally beyond the links 165 (FIG. 18) and carry the support rollers 169, on their opposed ends, which run on the upper edges of the support beams 160 (FIG. 14) during the upper run of the chain.

Each link 165 is formed to include an upper flat wall 170 which projects to the outermost roller 169 and which has four pivot lugs integrally formed therewith and depending from the lower side thereof, these lugs being laterally spaced. The one pair of lugs 171, which are in a leading position relative to the direction of chain movement (FIG. 17), extend straight down and have transverse pivot openings for receiving a pivot pin 167. The other pair of lugs 172 extend downwardly and rearwardly, relative to the lugs 171, and are provided with transverse pivot openings, at their rear ends, for receiving the next trailing pivot pin 167 of the chain. The lugs 172 are laterally closer together than the lugs 171 but these relative positions could be reversed. Each lug (FIG. 18) is provided with a bushing 173 in its pivot opening for cooperating with the pin 167. Spacer bushings 174 are provided between adjacent lugs 171 and 172 on the pin.

Figure 18:
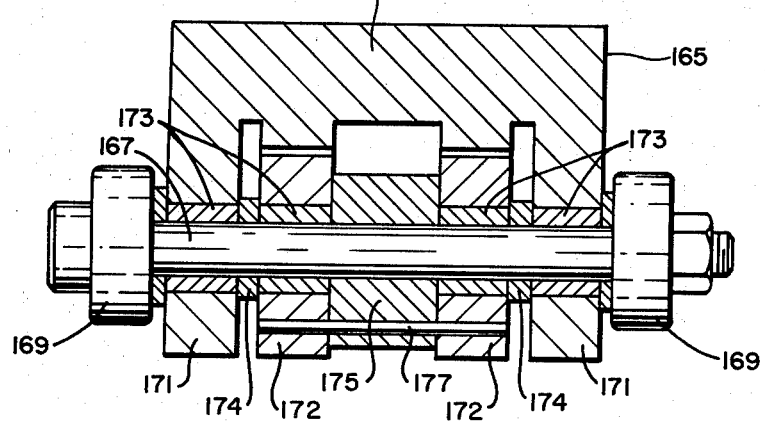
FIG. 18 is a transverse vertical sectional view taken along line 18—18 of FIG. 17.
Figure 19:
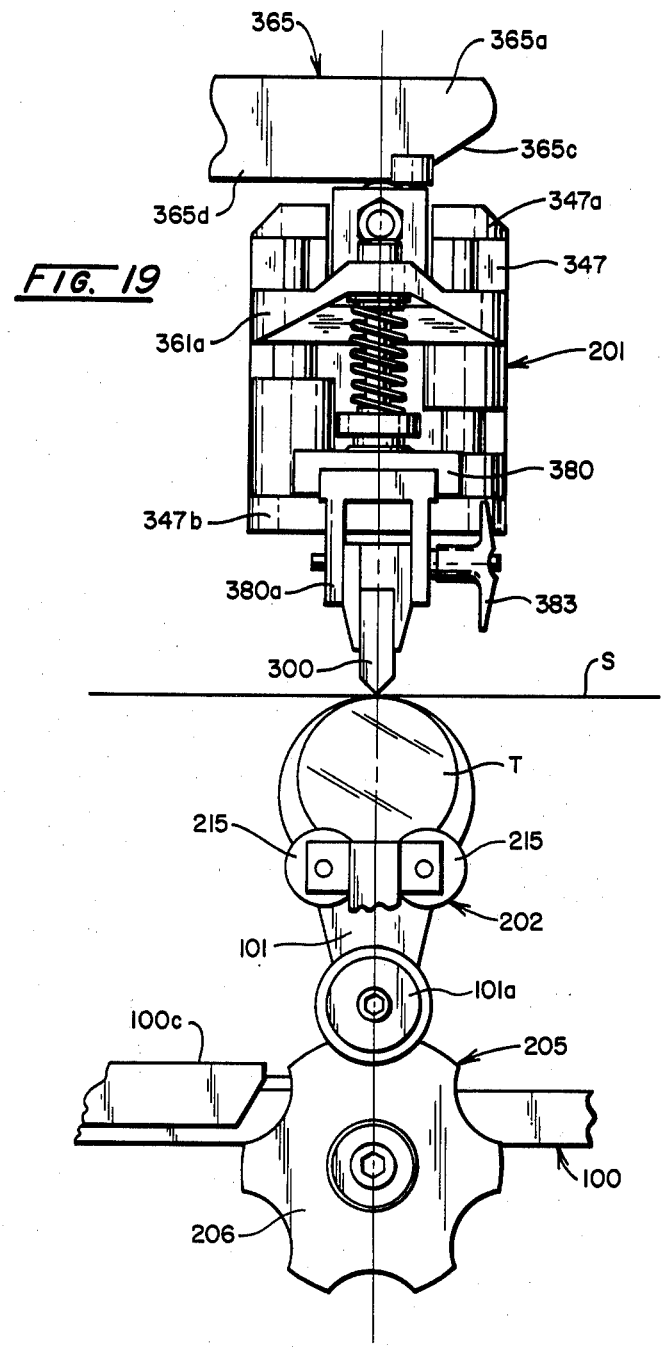
FIG. 19 is an enlarged schematic vertical longitudinal view of one of the squeegee carriers and associated screen and ware carrier at the printing station.
Figure 20:
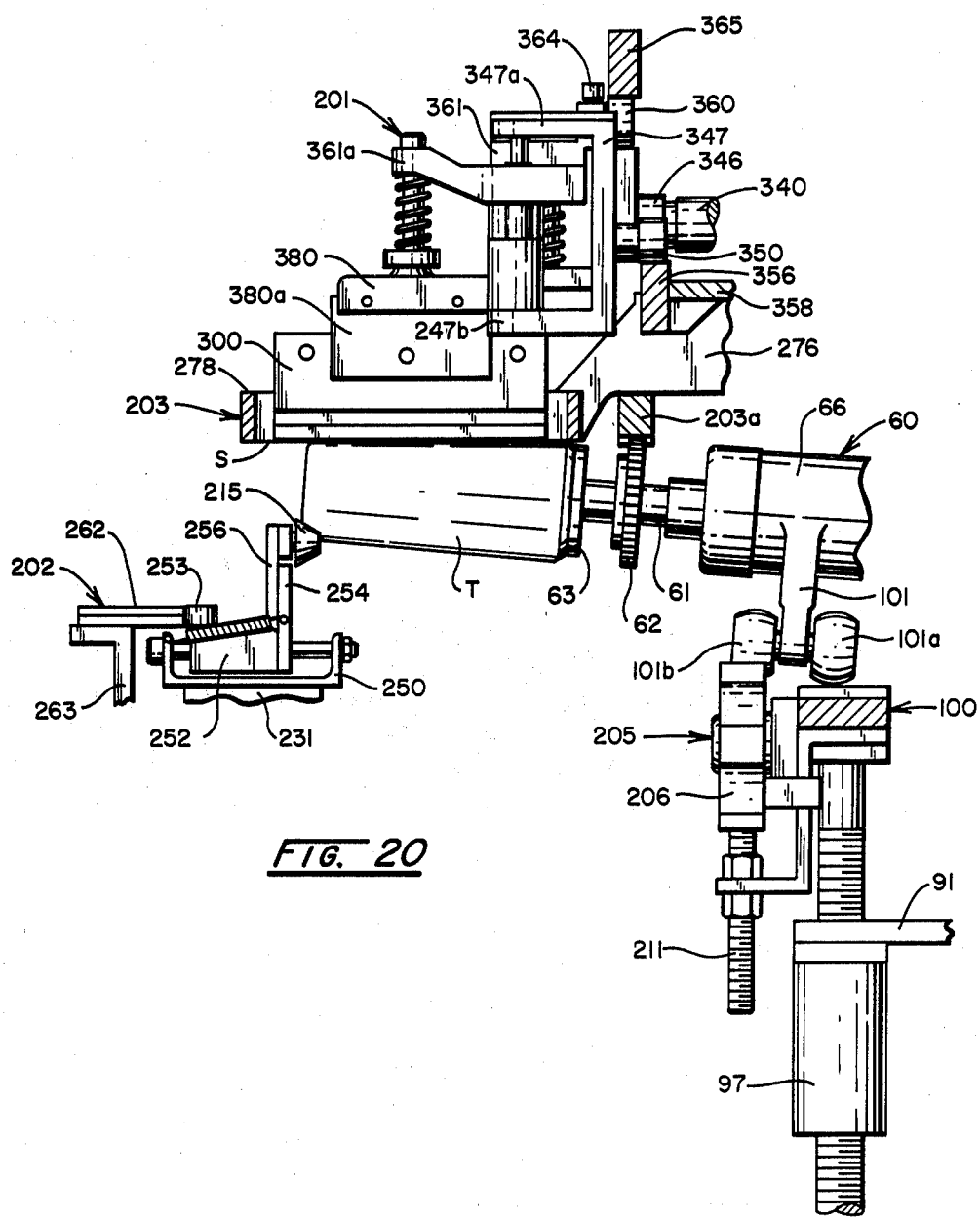
FIG. 20 is a partial transverse sectional view taken substantially along line 20—20 of FIG. 1 showing the same structure which includes the spindle lift means.

This chain formed of the pivoted links 165, is also provided with an eccentric arrangement for compensating for the chordal action by automatically changing the pitch of the links of the chain as they pass on and off the sprockets 166. Each eccentric is indicated by the number 175 and an eccentric is provided on each transverse pivot pin 167 between the lugs 172 (FIG. 18). Each eccentric 175 is pinned at its heavier side to the rear ends of the lugs 172 (FIG. 17) by a transverse pin 177. Thus, each chain link will be carried at its forward end, directly on a leading pivot pin 167 by the straight depending pivot lugs 171 and, at its rear end, by the lugs 172 on the next following pivot pin 167 which also has the eccentric 175 carried by the pin. The eccentrics 175 are engaged by the sprockets 166 in driving the chain. Each eccentric will be free to rotate on its carrying pivot pin 167 but since it is pinned by pin 177 to the rear end of the link, the eccentric will serve to vary the distance between the sprocket-engaging or contacting surfaces of the two successive eccentrics 175 and thereby change the pitch of the link. The rotation of each eccentric will occur automatically as the chain passes on and off each sprocket 166. Thus, as each link passes onto the counterclockwise-rotating sprocket 166, as illustrated schematically in FIG. 17, the pitch, is varied slightly and during continued movement off the sprocket, is gradually shortened and returned to normal. This is due to the fact that as each link 165 moves onto and off the sprocket, it rocks about the axis of the pin 167 which carries the eccentric 175 to which it is pinned. This, in turn, rotates that eccentric about the same axis and changes its relationship to the preceding and next eccentric and thereby varies the spacing of the sprocket-engaging surfaces of those eccentrics, and consequently the pitch of that link which is pinned to the eccentric. As each link moves onto and off the sprocket, the position of the eccentric pinned thereto is changed so that the distance between its sprocket-contacting surface and each sprocket-contacting surface of the eccentric pinned to an adjacent link is varied. This keeps the speed of the straight upper run of the chain constant and prevents "surging", resulting in accurate spacing of the tumblers T carried thereon.

This accurate spacing will result after the successive articles or tumblers T are loaded onto the conveyor 150 by the loader section 52a and are received on the successively longitudinally spaced load and unload elevators 180. At regular intervals an elevator 180 is carried by a link 165, as shown in FIGS. 12 and 14 to 16. Each link, which carries an elevator 180, is provided with a laterally extending elevator support arm 170a. The upper wall of this link is recessed to receive the inner end of the arm which is bolted thereto by the bolts 181. This arm 170a projects laterally outwardly and, on its outer end, has the elevator 180 mounted for vertical reciprocal movement. The elevator comprises a flat square plate or platform 180a which is secured on the upper end of a support sleeve 182 that is mounted for vertical reciprocating movement in guide sleeve 183. The guide sleeve 183 has a flange 184 at its upper end which fits into a recess in the upper surface of arm 170a and is fixed therein by bolts 185. A pin and slot arrangement 186 prevents rotation of the sleeve 182, in the sleeve 183, but permits vertical movement. The platform 180a is moved vertically by a cam roller 190 which is carried by a cylindrical guide member 191 which is vertically movable in sleeve 183 and has radial ears slidable in vertical guide slots 192 in the sleeve. One of the ears carries the roller 190 outside the sleeve 183. Normally, the member 191 is kept in its extended position by a compression spring 193 which is disposed within sleeve 182 and around a pin 194 which is connected at its upper end to the sleeve 182 and at its lower end to the guide member 191. Engagement of the roller 190 with a cam will raise the platform 180a and the spring 193 will yield to provide a cushioning effect under predetermined pressure.

Figure 12:
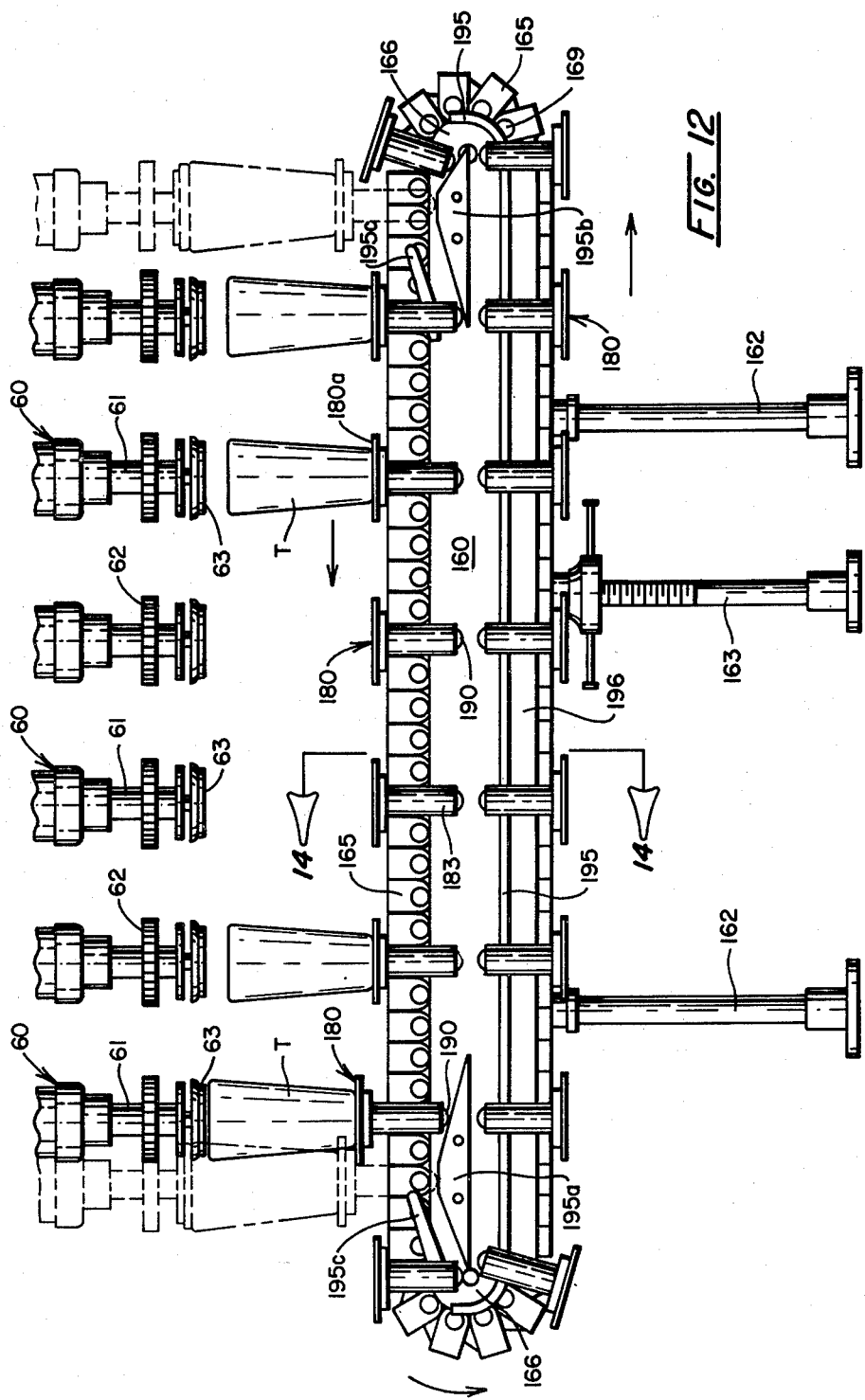
FIG. 12 is a side elevational view of the loading and unloading unit.
Figure 13:
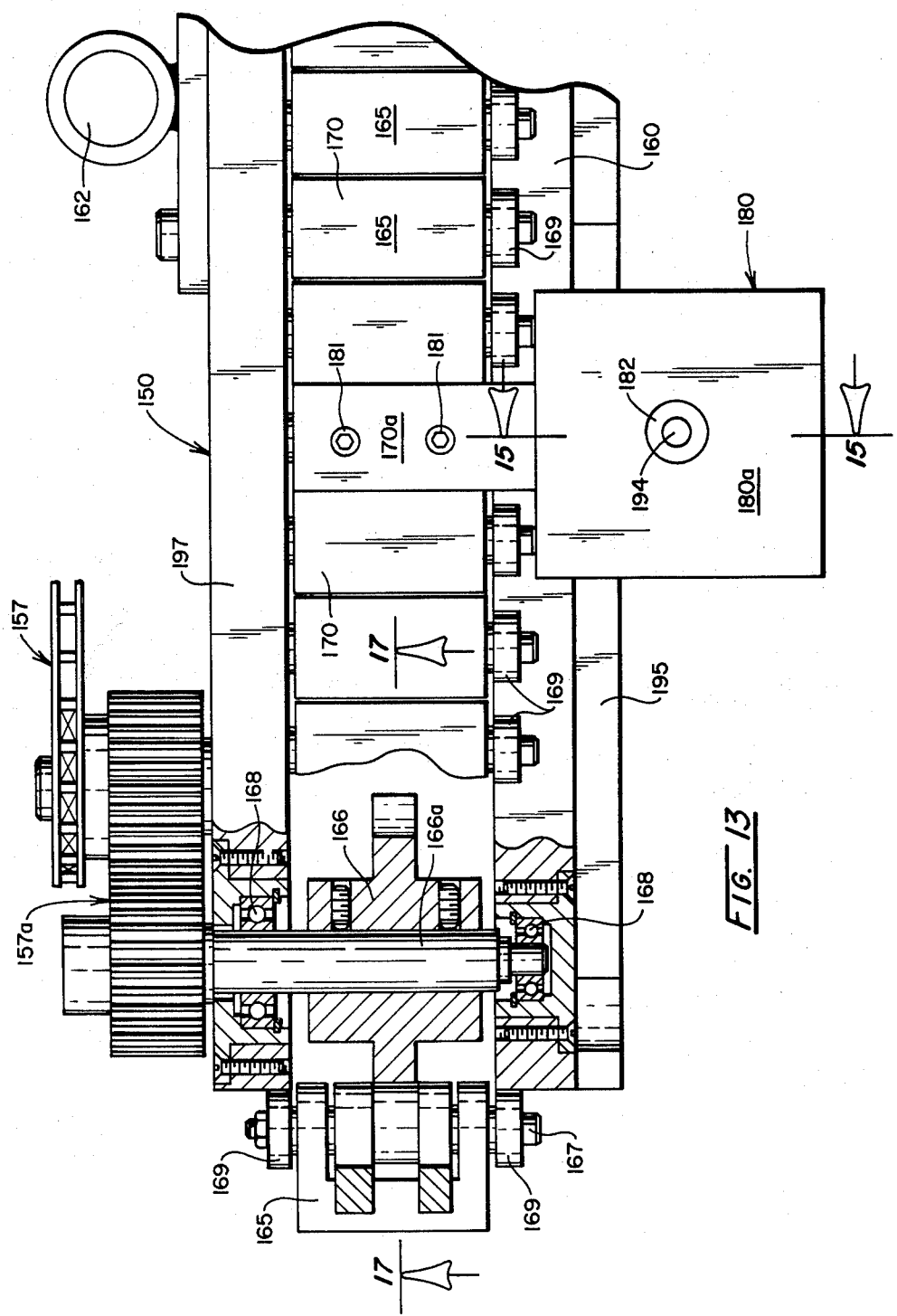
FIG. 13 is a plan view, partly cutaway, of the loading and unloading conveyor.
Figure 14:
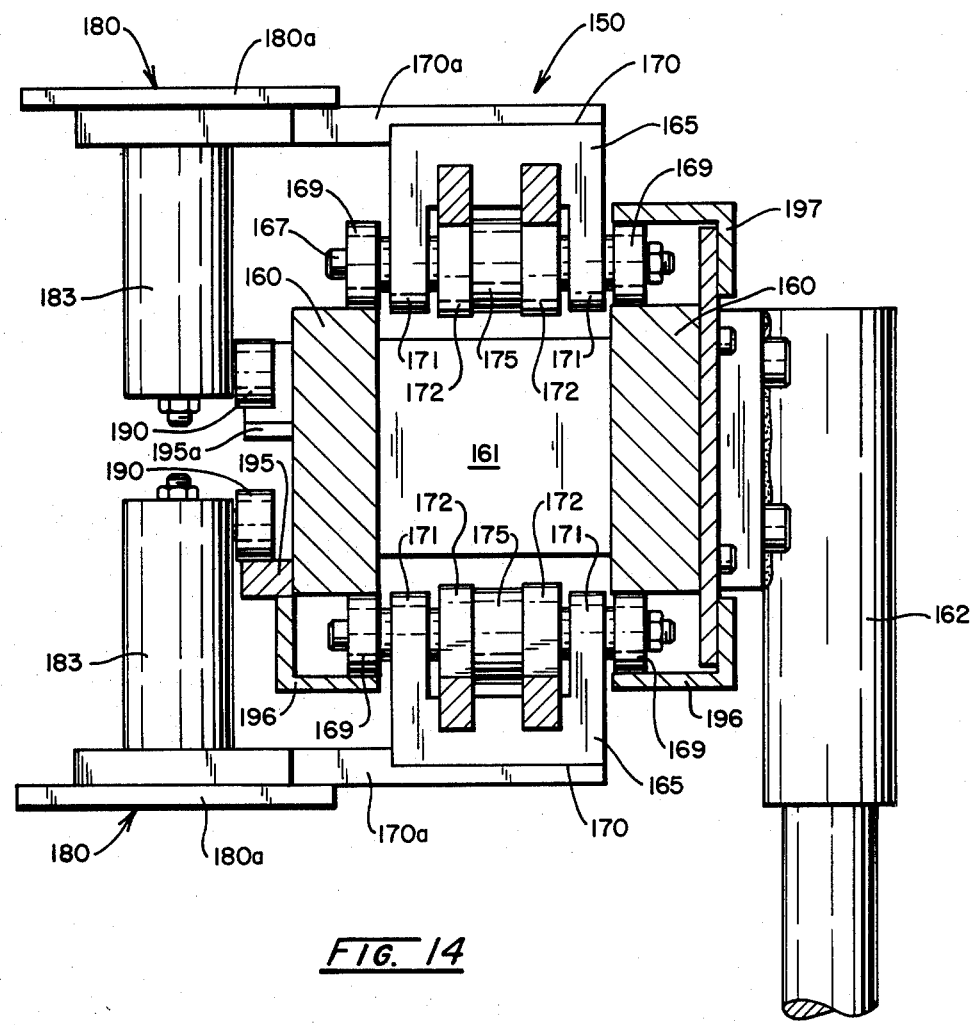
FIG. 14 is an enlarged horizontal sectional view taken along line 14—14 of FIG. 12.
Figure 15:
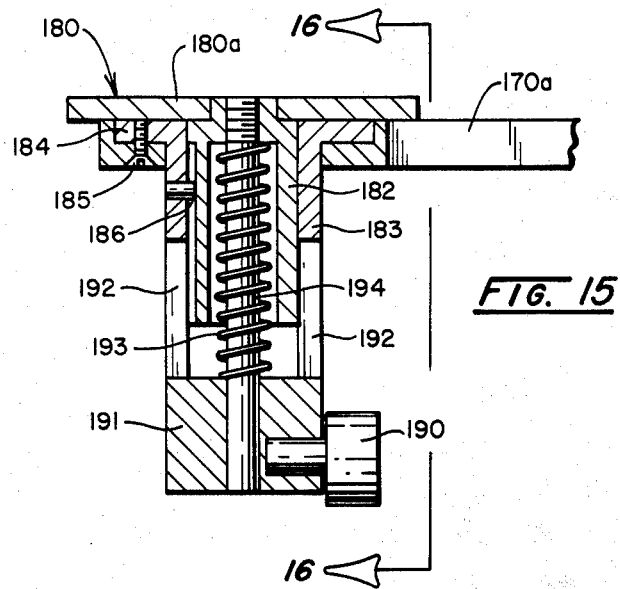
FIG. 15 is a transverse vertical sectional view taken along line 15—15 of FIG. 13.
Figure 16:
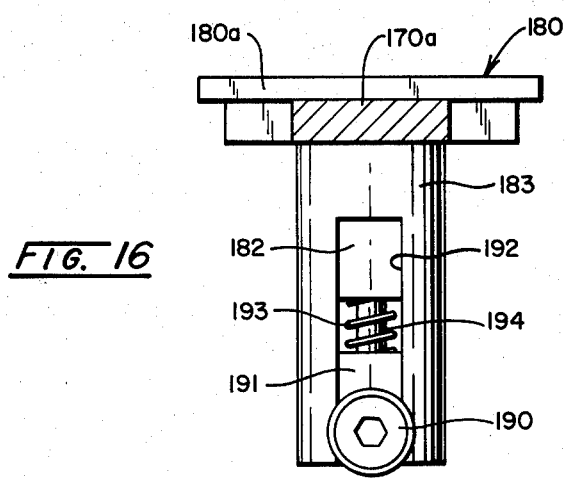
FIG. 16 is a sectional view taken along line 16—16 of FIG. 15.
Figure 17:
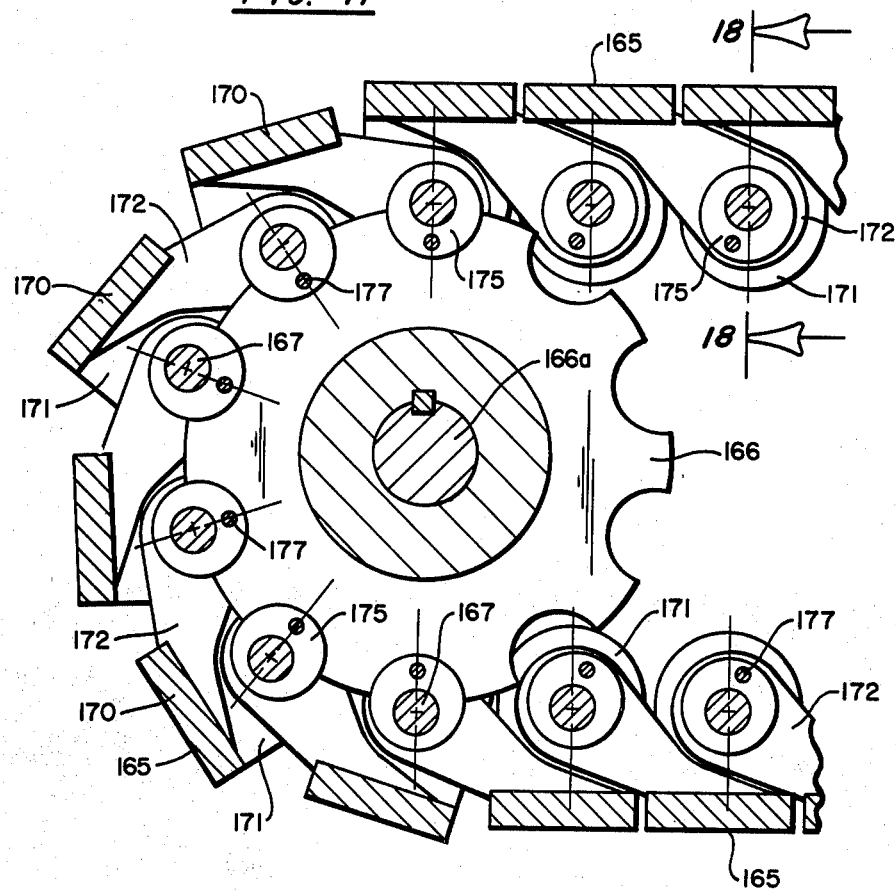
FIG. 17 is a longitudinal vertical sectional view taken along line 17—17 of FIG. 13.

At the loading section 52a, the rollers 190 will cooperate with the cam 195a and at the unloading section 52b they will cooperate with the cam 195b, these cams being mounted on the outer support beam 160 (FIGS. 12 and 14), for cooperation with the rollers when they are on the upper run of the conveyor. The inclined side of each cam has a pull-down bar 195c associated therewith for engaging roller 190 to pull down the sleeves 183 and the platforms 185a which they carry. When the rollers 190 are on the lower run of the conveyor 150 they are in engagement with track 195 which extends horizontally and upwardly at its ends partly around the sprockets 166 (FIG. 12), to suspend the guide members 191, and the platforms 180a. It will be noted from FIG. 13, that the platforms 180a of the elevators 180 are directly adjacent the outer edge of the chain of the conveyor 150 and, from FIG. 12, that they are supported by the chain at evenly-spaced longitudinal intervals on the chain. As previously described, the conveyor 150 is driven continuously and its upper run will travel past the loader and unloader unit 52 in the direction indicated by the arrows in FIG. 1. At the loader section 52a, the successive fingers 152 (FIG. 1) will swing continuously over the successive platforms 180a to push a tumbler T onto to each platform. Then with this conveyor, the platforms 180a are successively raised, by engagement of rollers 169 with cam 195a, so that the mouths of the tumblers T are engaged by the vacuum chucks 63 which are on the spindle sections 61 that are upright at this time. (FIG. 12). As the chain reaches and passes downwardly around the sprocket 166, the platform 180a will be lowered away from the bottom of the tumbler T by roller 190 engaging the pull-down bar 195c, and the roller will then run on track 195. The chain rollers 169 of the lower run of the chain will roll on tracks 196 provided by angles secured to the lower edges of the beams 160, and the inner rollers 169 on the upper run of the chain will be held down on the inner beam by an angle 197 (FIG. 14). At the unloading end of the conveyor 150, the action will be similar, except substantially in reverse, in that the rollers 190 will pass upwardly around the sprocket off the track 195, engage the cam 195D so as to lift the successive platforms 180a, into positions beneath the depending tumblers T, at which time they will be released and rest on the platforms. The rollers 190 will move on with the straight upper run of the chain and will travel down the cam incline, under the influence of pull-down bar 195c, to lower the platforms completely with the tumblers T thereon. Then, the fingers 152 (FIG. 1) of the unloader section 52b will engage the successive tumblers T and push them off the platforms 180a onto the unloader conveyor 57.

After the ware is loaded onto the carrier 50, as indicated above, it is carried to the first printing unit 53 and when it reaches that unit, it will be in substantially horizontal position, since the cam track or rail 100 will engage the cam rollers 101a of units 101 of the successive hinged spindle sections 66 to swing them upwardly into horizontal position, as the carrier 50 moves continuously from the loader 52a to the first printing unit 53. Each of the printing units 53 consists generally of two printing stations 53a and 53b. Each station has an upper continuously-moving endless squeegee carrier 201, a lower continuously-moving endless ware support carrier 202 and a screen support 203, for carrying a screen S, disposed in fixed position at an intermediate level. Each ware support 202 serves two squeegee carriers 201. The three printing units are illustrated in FIGS. 1 to 3 and 19 to 38.

At the time each article of ware, such as tumbler T, is moved beneath the screen S, carried by the screen support 203 of the first printing station, it is lifted upwardly against the screen of that station by a warelift unit 205, which is shown best in FIGS. 3 and 19 to 23, and which is located below the screen support 203 of that station. At this position, the cam rail 100 carries removable cam strips 100c and 100d for a suitable distance, the latter having an inclined lowering end 100e. Ahead of this strip is the lift starwheel 206 which will quickly lift each spindle carrier section 66, and the tumbler T carried thereby, into cooperation with the screens support unit 203 and the screens carried thereby. This starwheel, carried at the outer side of rail 100 (FIG. 21), will rotate in a counterclockwise direction (FIG. 22) and the carrier 50 will be moving to the left, so that the rollers 101b, carried by the carrier 50, will successively move into engagement with the rail cam 100c and the roller 101b will engage the starwheel to rotate it step-by-step. The starwheel 206 is rotatably mounted on a stub shaft 207 (FIG. 23) carried by a horizontal support 208 which, in turn, is carried by a bracket 209 that is attached to the under side of the cam rail 100 by bolts 210. The support member 208 is carried on the bracket 209 by screws 211 (FIG. 22) for accurate vertical adjustment. The member 208 also carries a cam strip 212 which is adjustable longitudinally relative to the rail 100 by means of its mounting on the member 208 through the clamping bolt and slot mountings 213. The cam 212 extends from, just beyond the starwheel 206, a suitable distance toward the inclined end 100e of the cam strip 100d on cam rail 100. The rotative position of the starwheel is indexed by a ball-type plunger 214 carried by support 208 (FIG. 23), which will yieldingly fit into hemispherical sockets formed in the adjacent face of the starwheel at angularly spaced positions (FIG. 22) shown in dashed lines on starwheel 206. The starwheel 206 will be rotated to successively indexed positions by engagement of the successive rollers 101b therewith and, at the same time, the roller is lifted to elevate the swingable spindle section 66 which carries it.

At the same time that the roller 101b of the lift unit 205 engages the starwheel 206, the bottom of the tumbler T, carried by that spindle section 66, is engaged by article-support rollers 215 carried by the carrier 202. Also at the same time, the gear 62, carried by that spindle section, is lifted into engagement with a rack 203a (FIG. 20) carried by the screen support 203 which serves to rotate the tumbler T, during its continuous travel beneath the screen S, registering means 64 (FIG. 5) being activated by the gear 62 disengaging the rack. The quick lifting of the gear 62 into contact with the rack 203a will prevent damage to the gear and rack.

The carrier 202 that carries rollers 215 is illustrated best in FIGS. 1, 2, 3, 19, 20, and 35 to 38. At each of the three indicated sides of the machine, two of these carries units 202 are supported on the upper horizontal member of a frame 216 (FIGS. 2 and 3) of elongated inverted U-form, the depending portions of which overlap the upstanding ends of a similar u-shaped frame 217. The frame 217 is mounted on the base 95, outside the posts 109, on lateral guides 218 for movement in-and-out relative to the posts by means of the handwheels and screws 219. Thus, lateral adjustment of rollers 215 is possible to allow for use of the machine on tumblers T of differing lengths of heights. Differences in diameters are compensated for by vertical adjustment of upper frame 216 on lower frame 217 which is permitted by pin and slot connections 221, between the overlapping end portion thereof, lever-operated clamps 220 being provided for holding the adjustment. For actually raising and lowering of the frame 216, a pair of jacks 222 are provided between the frames 216 and 217, adjacent their ends, and are actuated by hand wheels 223. The frame 216 has suspended therefrom the driving motor 225, gear box 225a and cooperating electronic synchronizer or resolver 226. This motor unit drives a timing belt 227 continuously and this belt will serve to drive both article support carriers mounted on the frame 216.

Upstanding from the upper wall of the frame 216, adjacent its inner edge, is a support plate 230 (FIGS. 35 and 37) which supports both of the carriers 202. Each carrier consists of an endless chain movable in a vertical plane and composed of links 231 hinged together by hinge pins 232. This chain is very much like the chain of the load an unload conveyor 150 previously described and is constructed in a similar manner to compensate for chordal action and thereby maintain constant speed. The chain of each carrier 202 is carried by a pair of sprockets 240 and, as shown, one of the sprockets of the one carrier shown in detail, is driven by the drive belt 227 (FIG. 36), whereas the other sprocket drives the belt drive 227a for the other carrier.

Each chain link 231 includes a flat plate which carries, as in the previously described chain of the loader and unloader conveyor 150, four inwardly-extending lugs which are divided into a pair of inner pivot lugs 241 and a pair of outer lugs 242. The lugs 241 project inwardly straight and are mounted on the pivot or hinge pins 232 whereas the lugs 242 extend forwardly, in the direction of the upper run of the chain, and downwardly to the preceding pin on which they are mounted by means of the eccentrics 243. Thus, each link 231 is carried by a leading pin 232 and a following pin, the mounting on the leading pin including the eccentric 243 and, the mounting on the following pin being the usual pivot. This arrangement is like that previously described for the mounting of the links 165 and the eccentrics 243 are pinned to the lugs 242 by the pins 243a, shown in dashed lines (FIG. 37) corresponding to pins 177 (FIG. 18). The eccentrics 243 on this chain are rotatable on the pivot pins 232 by swinging of lugs 242. Thus, as with the chain of conveyor 150, when the chain passes around the sprockets 240, there is compensation for chordal action so that the speed of the chain is maintained substantially constant. By this varying of the pitch of the chain, as before, the effect of the chordal action, which would otherwise occur, is overcome. The sprocket 240 engage eccentrics 243 (FIG. 37) provided on the pins 232 between the lugs 241 and spacer bushings are provided on the pins between the lugs 241 and 242. The pins 232 are provided on their opposed ends with support rollers 245 which engage the edges of the longitudinally extending support beams 248 which are disposed in laterally-spaced parallel relationship. Transverse webs 248a, serve as spacers for these beams, and this unit is mounted adjacent the upper edge of the upright support plate 230 by menas of the bolts 230a.

Each link 231 is provided on its flat wall with a U-shaped bracket 250 for mounting the ware-engaging rollers 215 thereon, and this bracket carries a pair of horizontal slide support pins 251. These pins carry a slide 252 which is movable by means of a cam roller 253 adjacent its outer corner. The slide 252, at its inner edge, carries a support arm 254 which has a guard or guide 255 fastened on its inner side. The support 254 carries the roller-carrying arm 256 which has its inner end pivoted, at 257, in a slot 258 and is normally pivoted against the inner surface of member 254 by the compression spring 259. This spring is carried by bolt 260, which is anchored to member 254, to push on pivoted arm 256. The rollers 215 are tapered rollers directed inwardly for engaging the bottoms of the ware T and are mounted as a pair of spaced cradling rollers by means of the axles 261.

The slide 252, and the rollers 215 carried thereby, is moved toward the ware, such as the tumblers T, to engage the bottoms thereof with a cradling action by means of rollers 253 and a cooperating cam 262. When the rollers 215 engage the articles, it will be a yielding engagement due to springs 259. The cam 262 is removably attached to the upper flange of an inverted L-shaped support plate 263. This upstanding plate is bolted to the outer side of the outermost support beam 248. The cam has a bevelled corner (FIG. 36), at its forward inner edge, for first engaging the successive rollers 253 as they continuously move into cooperation therewith. A pair of tension springs 264, connected between upstanding roller support 254 and bracket 250, pull the slide 252 outwardly to ensure engagement with the cam 262. The upper edge of support plate 230 carries a guard flange 265 to protect the inner rollers 245 on the upper run of the continuously moving chain from paint and any broken glass. The guard 255 similarly protects the slide supports 251. To prevent undue sagging of the lower run of the chain, a support rail 266 is provided on which the outer rollers 245 of the lower run of the chain will roll. This rail is supported by upstanding support bars 267 secured to the outer edge of the top wall of frame 216.

As indicated above the ware bottom support unit 202 and the ware lift unit 205 cooperate in lifting the ware T into cooperation with the screen S carried by the associated screen support 203. This screen support or carrier is shown in FIGS. 1 to 3, 20, 24 to 24B, and 34. It is located at the lower side of the squeegee carrier 201 which is supported by a depending frame 275 that also supports the squeegee carrier. Below this frame is a longitudinally extending horizontally disposed support frame 277 which carries a pair of outwardly-extending horizontal screen support arms 276 (FIGS. 3, 20, 24, and 24b). The outer end of these arms 276 support a rectangular screen stretch frame 278. The horizontal support frame 277 is carried by the vertically adjustable end members 275a of the vertical support frame 275 so that it is vertically adjustable therewith.

The screen S is stretched around the ends and fastened suitably in the frame 278 (FIG. 34) which has outwardly projecting flanges 278a that rest on the upper surfaces of the arms 276 and are clamped thereto by bolts 278b. The screen S is clamped to the ends of stretch frame 278 by bolts 279 and clamp fittings 278a.

An electrical connection 280 is usually made to the screen frame 278 to heat it and may be through one of the bolts 279. A paint pump 281 and paint reservoir 281a of a suitable type are usually provided and are shown attached to one of the vertical frame members 275a and the pump is provided with a suction line 282 which has an inlet fitting 283 so disposed that its inlet will be within the screen frame 278 at its downstream end (FIG. 24) so as to pick up excess paint which is forced to that end by the squeegees 300 operating in the screen frame 278 as will later appear. The paint is returned to the opposite or downstream end of the screen frame 278 by the paint pump 281, through the paint reservoir 281a, valve 285 and line 284, that discharges paint into that end of the screen stretch frame 278. The valve 285 controls the amount of paint discharged in frame 278.

At one end of the frame 278 is a squeegee scraper 286 which tends to wipe excess paint from the squeegee 300 as illustrated schematically in FIG. 34. This scraper 286 comprises a support plate 287 which is inclined downwardly and inwardly above that end of the screen frame 278 which also carries the fitting 283. The plate 287 is bolted, by bolts 288, to a block 289 that is fastened for vertical adjustment, by bolts and slots 290, to a support 291 carried by the vertically adjustable frame member 275a. The plate 287 carries a pair of parallel side frame members 291 which are inclined upwardly and outwardly away from the screen S and which carry a plurality of transverse spaced scraper rods 292 disposed along an upwardly and outwardly inclined plane. As will later appear, the squeegees 300 will wipe along these successive rods so that excess paint will be scraped therefrom, will fall onto the inclined plate 287 and will flow down the plate onto the screen S adjacent the inlet 283 to be picked up at that point. The scraper may be heated by hot air supplied through line 293 to the hollow side frame members 291 which will heat the rods 292. The screen frame support arms 276 also carry the registering rack 203a (FIGS. 20, 24, and 24b) previously referred to, which meshes with the pinion 62 of the spindle assemblies to register the articles such as tumblers T, as they move continuously into printing relationship with the next screen S and to maintain that registry with successive screens. This rack 203a is carried by the screen support arms 276 directly inwardly of the screen frame 278 and is fastened removably to the arms 276 parallel to the adjacent side of frame 278 by means of clamp bolt units 302b.

The arms 276 and the horizontal screen stretch frame 278 carried thereby can be adjusted vertically relative to the support members 275a by means of sets of parallel linkage 295 (FIGS. 24a and 24b) carried on each member 275a. Each set of linkage comprises parallel links pivotally connected to both members 277 and 275a and activated by lever handles 296 which are connected to the sets of parallel linkage. With this arrangement, the screen frame 278 may be quickly raised or lowered for cleaning and changing of the screen S but the screen frame 278 will always be horizontal.

The end frame members 275a are part of the lower portion 275c of the frame 275 which is of rectangular form. This lower frame portion 275c is received within the depending end portions 275b of the upper frame portion 275d which is of inverted U-form (FIGS. 3, 24a and 24b). The upper frame portion 275d is supported by means of an upper flat plate 302 which rests on spaced parallel support beams 303 which are carried by the upper main horizontal support frame 108. Clamp bolt and slot connections 301 are provided between the overlapping frame end portions 275a and 275b to permit relative sliding vertical adjustment. Between the overlapping portions 275a and 275b vertical guides 275e are provided to guide the adjustment. This adjustment is accomplished by means of a vertical screw 304 which is operatively connected between the plate 302 and a bracket 305, carried by a cross-member 306 of the lower frame portion 275c. Screw 304 is activated by a hand wheel 304a.

The lower portion 275c of the frame 274 supports the squeegee carrier unit 201 is mounted within the upper portion 275d of the frame 275 for in and out slidable movement relative to the screen support unit 203. Slides 275f are provided at each end of frame 275c with locking bolts 275g for suspending it from the cross member 306 which suspends it from upper frame portion 275d. This is accomplished by means of a handwheel-activated screw unit 307. Thus the screen S can be adjusted vertically by means of handwheel 304a and in and out by mean of handwheel 307.

The lower frame portion 275c supports the endless squeegee carrier unit 201, that is shown best in FIGS. 1, 2, 19, 20 24A, 24B, and 24 to 33, by means of a cross plate 310 carried thereby and which is secured at its inner edge to the upright plate 311 (FIG. 25) which is at the inner side of the frame portion. Plate 311 also carries the upright back plate 312 and cam plate 313 in flat contact at its outer surface. Chain support beams 314 and 315 are provided outwardly of the cam plate 313 and are held in transverse, parallel, longitudinally extending relationship by transverse webs 316 (FIG. 26). The combined beam structure is rigidly secured, in a horizontal position, to the outer plate 313 by means of supports 317 fastened between the plate 313 and the inner beam 314. These beams support the sprockets 320, at their respective ends, which are carried by shafts 318 mounted in anti-friction bearings 319 carried by the beams. One of the shafts 318 extends through the plates 311, 312 and 313 (FIG. 25) and is driven continuously by an electric drive motor 325 (FIGS. 1, 2 and 3) which has an electronic resolver 326 cooperating therewith. This electric motor and resolver may be of any suitable type but one found suitable is manufactured by Controls System Research.

The sprockets 320 support the endless chain of the squeegee carrier 201 which is formed of links 331 hinged or pivoted together by the hinge pins 330. The endless chain will be driven continuously in a vertical plane and will support the squeegees 300, at longitudinally spaced intervals, for movement into and out of cooperation with the screen S on the screen support unit 203. The endless chain, carried by the sprockets 320, is similar in structure and function to the endless chain of the loader and unloader conveyor 150 and that of the conveyor of the ware support unit 202. This chain includes a similar eccentric arrangement for maintaining the speed of the chain substantially constant, as the squeegees 300 contact the screen S, by compensating for the chordal action which occurs as the chain travels around the sprockets 320.

The links 331 are practically identical to the links 231 of the article support carrier 202 and are provided with identical eccentrics cooperating therewith to compensate for chordal action in substantially the same manner. Each pin 330 carries an eccentric 332 engaged by the sprocket. Each link 331 has the two pairs of lugs 333 and 334, the lugs 333 extending straight inwardly and being mounted directly on the lug pin 330, and the lugs 334 extending angularly, inwardly and rearwardly in the direction of travel (FIG. 24) of the upper run of the chain and being carried by the next following hinge pin 330, being carried thereon by eccentrics, as before. Each hinge pin 330 carries on its opposed projecting ends the support rollers 335 which cooperate with the edges of the support beams 314 and 315. At the upper and lower edges of the beams flanges 336 are disposed parallel thereto for cooperating therewith to form guides for the rollers 335 to maintain upper and lower runs of the chain straight or horizontal. These flanges 336 are carried on the upper and lower edges of plated 314a and 315a which are fastened to the exposed faces of the respective beams 314 and 315.

Each link 331a (FIG. 25) carries a transverse pivot sleeve 340 at its outer side which has its opposed ends projecting therefrom. This sleeve rotatably receives a rock shaft 341 that projects from opposite ends thereof. The inner end of this shaft has a rocker arm 342 fixed thereon which carries a cam follower roller 343 that cooperates with a cam groove or guide 245 formed in the plate 313. This cam groove 345 is in the form of an upright oval (FIG. 24A). The other end of the rock shaft 341 slidably extends into a sleeve portion 346 of a squeegee-carrying bracket 347 (FIG. 29). The shaft is connected to the sleeve portion by a pin and slot connection 349 which prevents relative rotation but permits sliding movement of the bracket in and out on the shaft, the shaft also being provided with a stop flange 348 at its end extremity. The bracket 347 is generally U-shaped in a horizontal plane and C-shaped in a vertical plane and extends outwardly. The entire bracket 347 is held in vertical dependent position, about the axis of shaft 341, by means of a pair of cam rollers 350, located on the outer side of the bracket 347 intermediate its height, and carried by integral lugs 349b (FIG. 28). These rollers 350 cooperate with roller 343, which operates in cam groove 345, in maintaining this vertical position of the bracket, as it travels continuously in a closed vertical path around with the squeegee carrier chain. The rollers 350 will operate on a cam 355 (FIG. 25) when they are along the upper run of the squeegee carrier chain and on a cam 356 when they are along the lower run of the chain. The cam 355 is supported along the upper edge of the inner plate 315a and is a straight cam strip extending substantially the full distance between the sprockets 320 (FIG. 24). The cam 356 is supported below the lower run of the chain by means of brackets 357 carried by a horizontal lower support plate 358 which, in turn, is carried by transverse supports 359 carried at the outer edges of upright outer plate 311. This cam is also a straight cam strip and extends between the sprockets but its leading end (FIG. 24) extends beyond the adjacent sprocket. An additional small roller 343a is carried by rocket arm 342 below roller 343 to ensure that bracket 347 assumes vertical position when it starts to move with the chain above the respective sprockets 320. This roller engages a cam 345b at the upper left-hand corner of cam plate 313 and a cam 345a at its lower right-hand corner. (FIGS. 24A and 26).

Vertical movement of the squeegee 300, which is carried by bracket 347, is controlled by means of a roller 360. This roller is carried by a plate 361 which is mounted for yieldable downward movement on the bracket. The plate 361 has a lug 362, at its outer corner, which carries the horizontal axle of a smaller roller 364 which is located just inwardly of the roller 360 and which is provided for controlling the in-and-out sliding movement of the bracket 347 on the shaft 341, which movement is indicated by broken lines in FIG. 25. The roller 360 will cooperate with a chain cam unit 365, when the roller is on the lower run of the squeegee carrier chain, as will be described more fully later. The roller 364 will cooperate with a cam 366, which it normally misses, as it passes by it on the upper run of the chain and the cam is in its normal position. However, this cam is movable to a roller-engaging position.

The cam 366 is carried on the lower side of the horizontal plate 310 at its outer edge (FIGS. 24 and 25) and is pivoted thereto for in-and-out swinging movement by a pivot 367. It is swung outwardly, at proper times, so that the roller 364 will engage it, by means of an actuater 368 which is connected thereto by an actuating rod and which is spring-returned. This actuating device is operated by the switch 90 (FIG. 5), previously referred to, which is energized whenever the vacuum chuck 63 of the spindle assemble 60 fails to receive a tumbler T. Engagement of roller 364 with the outwardly-angled cam 366 will move the squeegee bracket 347 outwardly and cause the roller 360 to miss the chain cam unit 365 and pass by it without moving the squeegee 300 down into engagement with the screen S and thereby damaging it because there is no tumbler T present on the spindle assemble. Thus, roller 364 is moved outwardly by outwardly-angling cam 366. A cam 366a is provided for returning the roller 364 to its normal position after the roller 360 passes the chain cam 365. It is located in a fixed position on the underside of plate 310 at the opposite end of the upper run of the chain and will be angled inwardly so that as the roller 364 engages it, the roller 360 is returned to a common vertical plane with chain cam 365.

The rollers 360 and 364, as indicated, are carried on the plate 361 which is mounted for downward yielding movement on the bracket 347. The plate 351 is mounted for vertical movement on the bracket by means of a sleeve 370 (FIGS. 27,28 and 29) which has a bushing 370a fixed therein and slidable on a pin 371 mounted upright between a lower horizontal arm 347b and one of the upper horizontal arms 347a of the bracket 347. A spring return unit 375 is provided for resisting downward sliding movement of sleeve 370 on the pin 371 and consists of a pin 376 depending from the part 361a, attached to plate 361, and slidable in an opening 377 in fixed bracket part 373, and a cushion spring 374 surrounding the pin and disposed between the part 361a, and the part 373. The part 361a is a squeegee-support arm which extends outwardly from the bracket 347 and carries a depending bolt 378 which is threaded at its lower end into a squeegee-supporting yoke arm 380 and is provided with a lock-nut 379. The bolt is slidable vertically in arm 361a and is yieldably held in its lowermost position normally by means of a compression spring 381 surrounding the bolt. The yoke arm 380 is carried by and extends outwardly from a sleeve 382 which is mounted for vertical slidable movement on a pin 371a, like the pin 371, and similarly carries the relatively fixed lower bracket arm 347b and the other upper bracket arm 347a. The sleeve 382 has the yoke arm 380a extending laterally therefrom and carries a bushing 382a which is slidable on bushing 370a. This will permit vertical movement of sleeve 382 but not rotative movement. Relative vertical movement of arm 380 on bracket 347 against the force of spring 381 is permitted but the arm will not swing around the axis of bolt 378. Plate 361a can also yield relative to arm 380 by means of springs 374.

Figure 25:
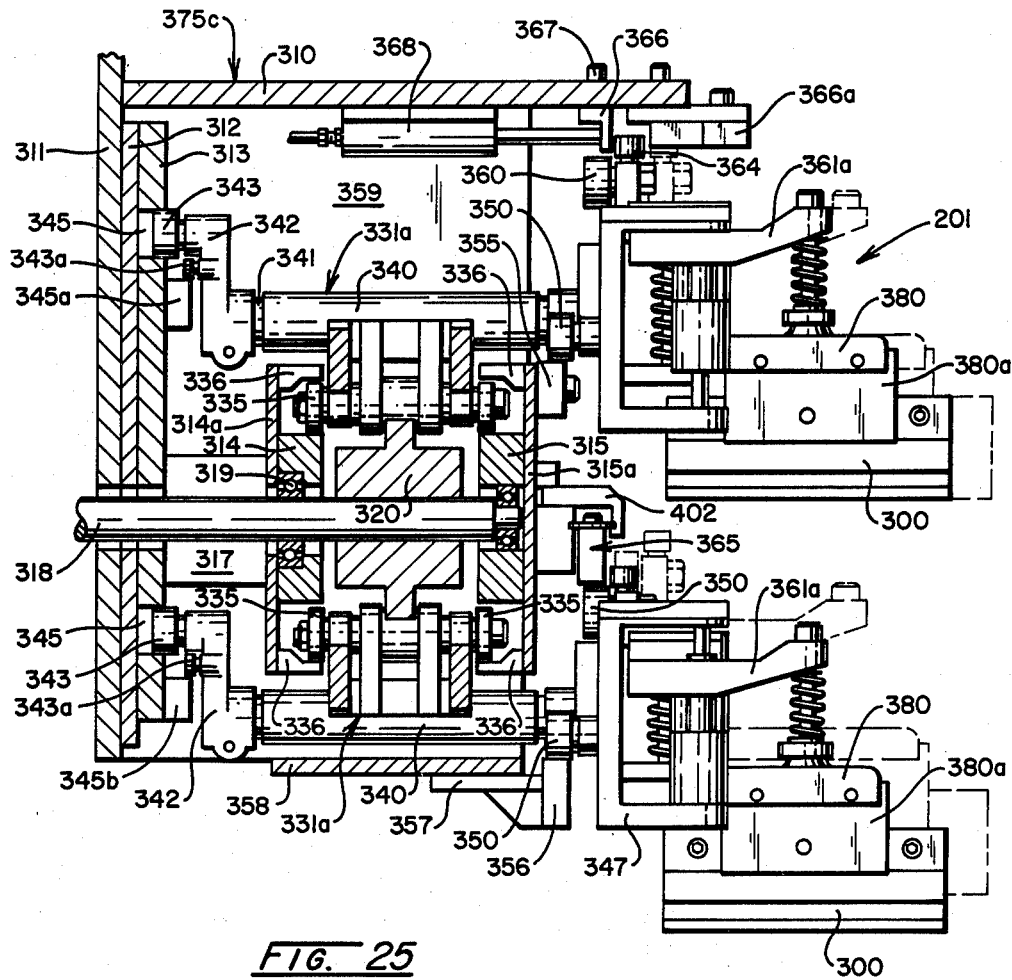
FIG. 25 is a transverse vertical sectional view taken along line 25—25 of FIG. 24.
Figure 35:
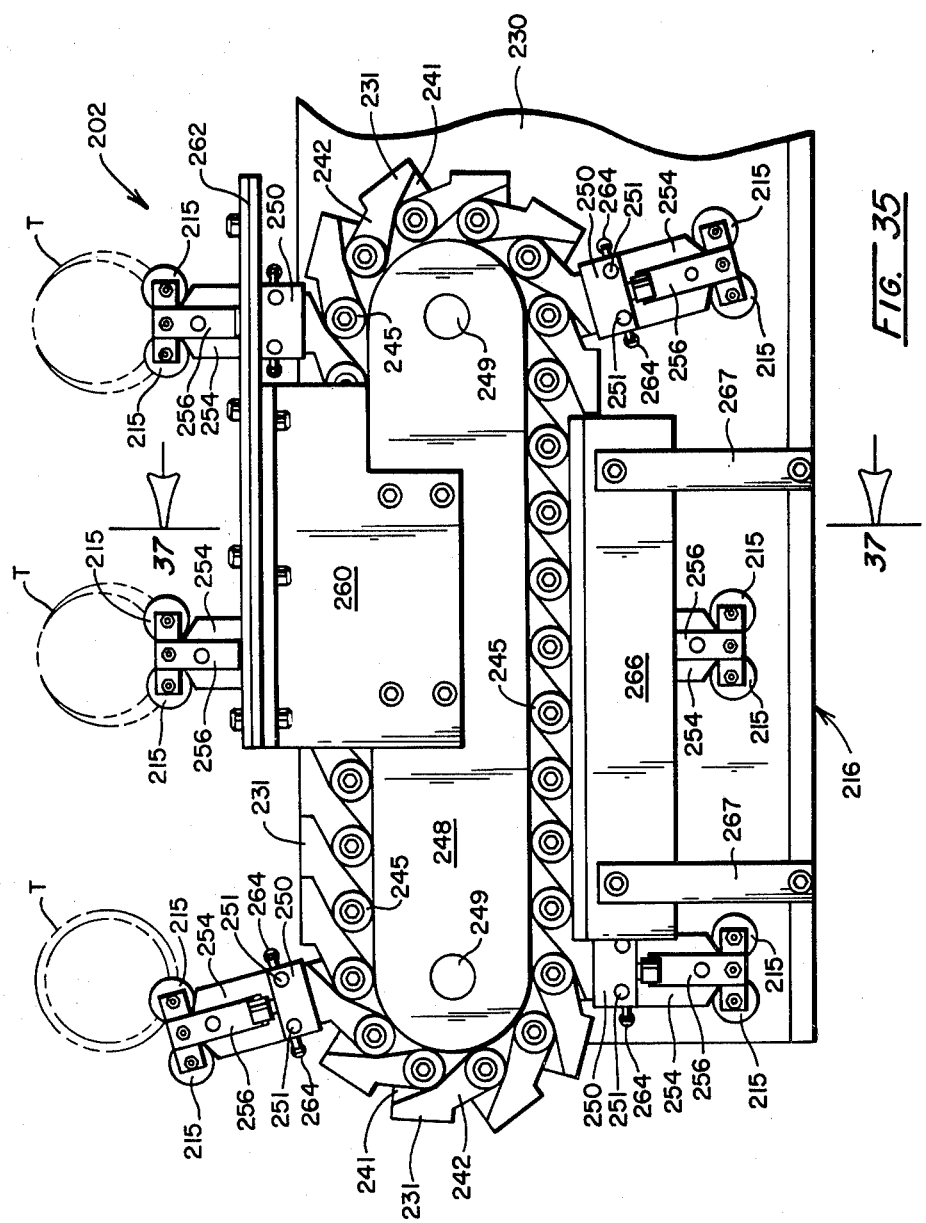
FIG. 35 is a side elevational view of the ware support assembly for engaging the ware during the printing operation.
Figure 36:
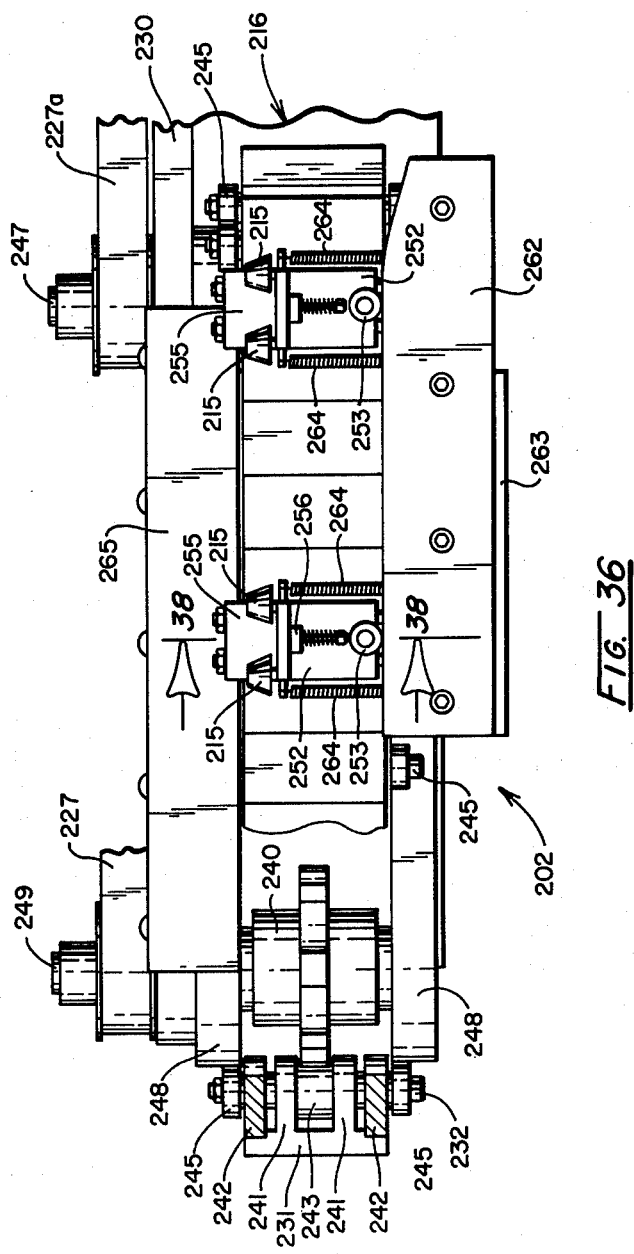
FIG. 36 is a plan view, partly cutaway, of the assembly of FIG. 35.
Figure 37:
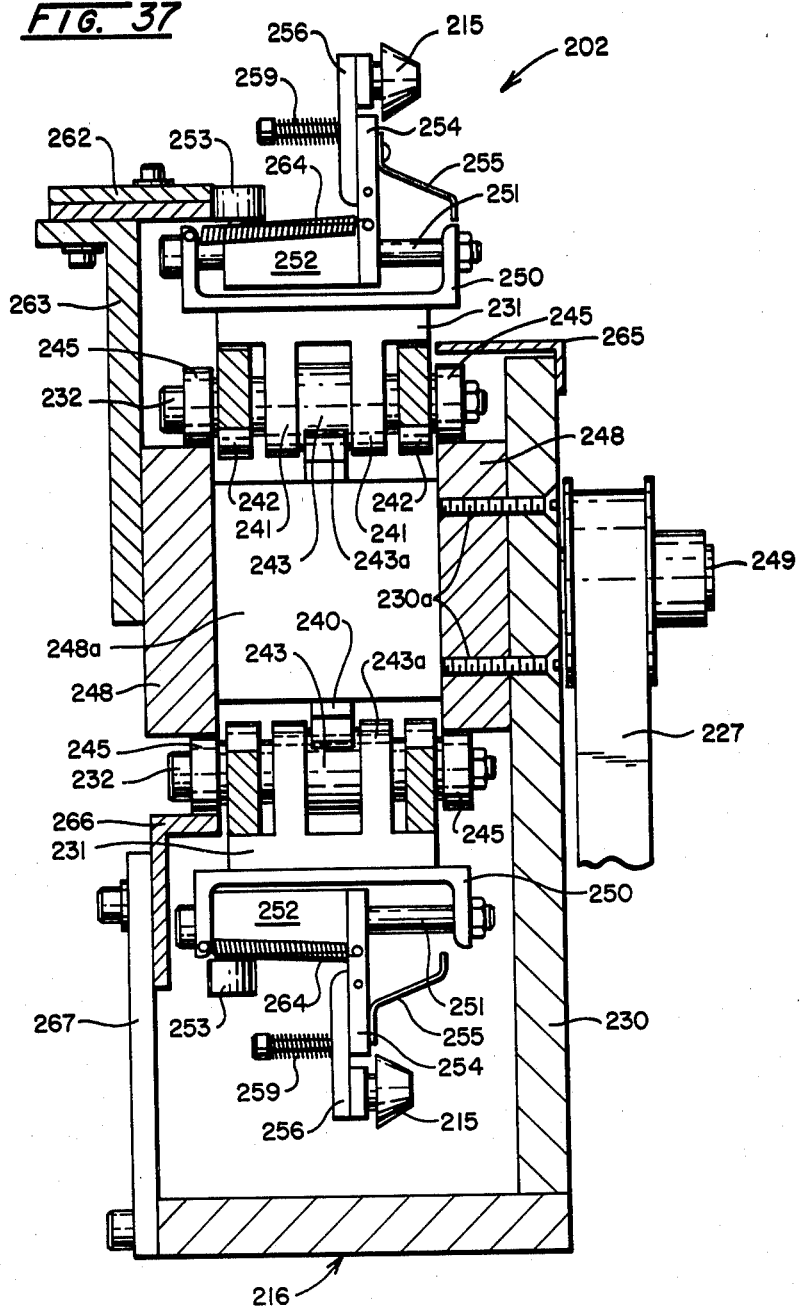
FIG. 37 is an enlarged transverse vertical sectional view taken along line 37—37 of FIG. 35.
Figure 38:
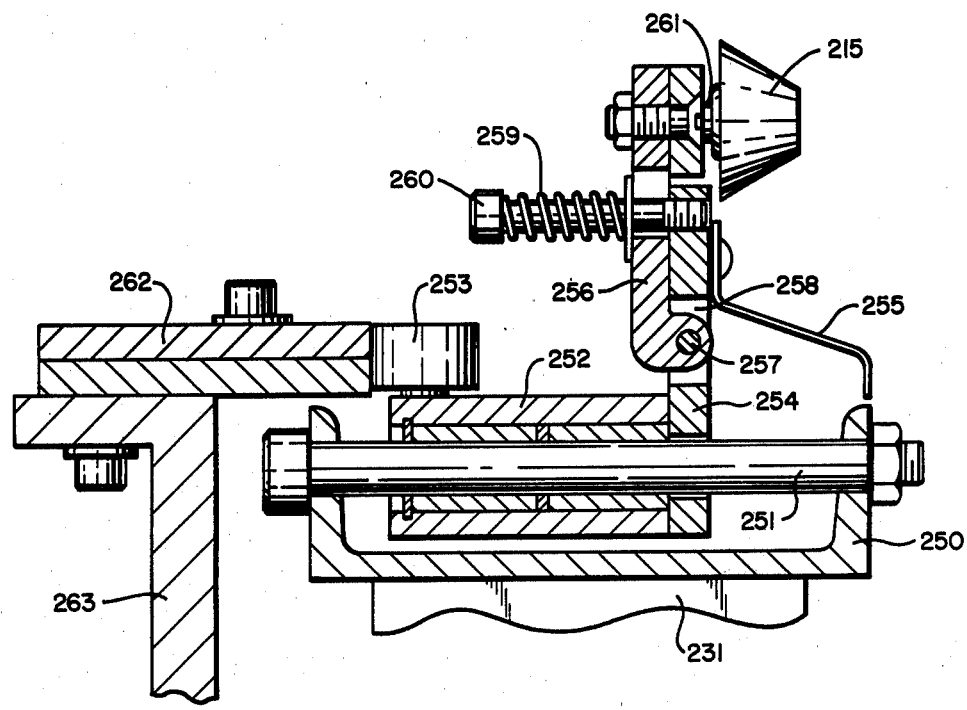
FIG. 38 is an enlarged transverse vertical sectional view taken along line 38—38 of FIG. 36.

The yoke support arm member 380 provides a downwardly opening socket for receiving a squeegee yoke 380a which is held therein by screws (FIG. 25). The squeegee 300 is removably mounted in the socket by means of a removable finger-grip pivot pin 385 which is extended transversely through aligning openings in the flanges of the yoke 380a and the squeegee 300. This will serve to pivot the squeegee for limited rocking movement transversely of the screen S.

The chain cam unit 365 is provided for moving the successive squeegees 300, which are carried over the screen S, downwardly into contact with the screen at the proper times. It is shown in detail in FIGS. 19, 24, 25, 30 to 33. As indicated in FIG. 24, the unit 365 is located at a level just below the axis of the sprockets 320 and extends substantially the distance therebetween with its fixed leading end 365a extending slightly beyond the adjacent sprocket axis. The fixed part 365a of the cam unit will always start the downward pressure on the successive rollers 360, as they move continuously into engagement therewith, and the start of contact of the squeegee with the screen S, but the adjustable chain 365b of the unit can be adjusted to vary the effective length of the cam unit so as to determine the length of travel of the squeegees 300 in contact with the screen S. This variation will be made in accordance with the various size diameters of tumblers T to be decorated on the machine.

The fixed part 365a of the cam unit 365 is supported by the outer upright plate 315a on its outer face (FIGS. 30 to 33). It is provided with a flat outer face and a lower horizontal cam edge 365d. A downwardly and rearwardly inclined leading edge 365c merges with the edge 365d. The inclined edge 365c is first engaged by the roller 360 and then the straight lower edge 365d is engaged by the roller. It will be noted that the inclined edge 365c extends beyond the axis of the adjacent sprocket 320. The inclined cam edge 365c will engage the successive rollers 360 to move the successive squeegees 300 down into contact with the screen S. To aid in obtaining this initial contact of each squeegee with the screen at the proper instant, a revolving arm 391 is provided which will engage the successive rollers 360. This arm 391 (FIGS. 30 and 31) which is mounted for vertical swinging movement, directly inside the cam 365a, around the axis of the axle 392, which is carried by a bearing 393a on a bearing support disc 393. The disc 393 is bolted by bolts 394 to the face of plate 315a around a circular opening formed therein. Behind this opening is a cup-like housing 395 which is also fastened in place by the bolts 394. The axle 392 has keyed on its inner end a pinion 396 which is supported for rotation by a bearing 397 carried by the disc 393. This pinion meshes with an internal gear 398 which is mounted on housing 395 by a bearing 399, and driven by sprocket 320 through shaft 318a, on an axis concentric with the axis of internal gear 398. When internal gear 398 is rotated, it revolves around pinion 396 to drive it and thereby cause arm 391, to travel bodily in a circular path, the pinion being driven at a greater speed, in the example shown, twice the speed of the internal gear. Thus, the arm 391 will engage the successive rollers 360 just as each engages the cam edge 365c. Then the roller 360 will engage the cam edge 365d and move on beneath the straight lower edge 365e of the chain section of the cam.

This chain section 365b consists of a plurality of chain links 400 hinged together by vertically disposed pivot or hinge pins 401, which extend through interfitting portions on adjacent links. The link 400a at the outer end or trailing end of the chain section, relative to the direction of movement of rollers 360, is slightly different, being provided with an upwardly inclined edge 400b. The outer or exposed part of the chain cam is supported by an angular bracket 402 bolted, by bolts and clips 403, to the face of plate 315a intermediate its height and extending longitudinally thereof. Beneath this angle and fastened thereto, by bolts 404, is a guide strip 405 which extends parallel to the depending flange 402a of the bracket 402. Members 405 and 402a have opposed guide slots 406 for receiving the guide flanges provided by washers 407 carried rotatably on the upper ends of the pins 401 and resting on the upper edges of links 400.

The movable cam chain passes inwardly around the end of bracket 402, along a curved guide 407a (FIG. 33) at the end of cam 365a, and through an opening in plate 315a, and associated plates, into a storage and guide tube 409. This tube is supported by the beams 314 and 315 and extends transversely thereof. The tube 409 has the opposed guide lips 410 along which the guide washers 307 slide. To adjust the chain cam so as to expose more or less of it, a flexible push-pull rod 411 is connected to the inner end thereof and extends inwardly through the cam plate 313 and associated plates. The inner plate 311 carries a bracket 412 which supports a sleeve 413, in which this rod slidably extends, and this sleeve may extend to a convenient operating position outwardly of the upper frame 108 (FIG. 3) where it can be activated by a lever 414 pivoted to a bracket 415 carried by the plate 302 above the respective squeegee carrier 201.

During normal operations of the machine, the rollers 360 will successively engage the edge 365c of the fixed cam section 365a, to force the squeegee carrier bracket 347 downwardly, and squeegee 300 carried thereby downwardly into contact with the screen S. This will be aided by the revolving arm 391. This causes engagement of each continuously-moving squeegee 300 with the stationary screen S as the article or tumbler T is lifted thereagainst by the lift unit 205. The rollers 360 then move on into engagement with the chain cam section edge 365c and this will continue to hold the squeegee in contact with the screen. The period of this contact will be determined by how much of the chain cam is exposed and this can be varied by actuating lever 414. The exposed chain cam length will be varied in accordance with the diameter of the tumblers T being decorated.

If an article is not on the particular spindle assembly 60 moved beneath the screen S, the actuator 368 will have been actuated to move the respective roller squeegee-carrying bracket 347 outwardly. Thus, the roller 360 will not be pressed down by the cam unit and the squeegee will not engage the screen so that damage to the screen will be avoided. However, as the bracket 347 reaches the upper run of the squeegee carrier unit 201, the roller 364 will engage the fixed cam 366a and the bracket 347 will be returned to its original position so that roller 360 will subsequently engage the lower edges of cam unit 365.

The electric circuitry for the machine may be generally of the type indicated schematically in FIG. 1 and 39. A main electric panel 420 will be provided which will be connected to a main control panel 421, to the main drive unit 423 which includes motor 120 and resolver 123, and to the emergency stop 422. The main drive unit 423 also connects back into the main electric panel 421.

The main panel 420 is also connected to the printing unit control panels 433, 434 and 435 at each side of the machine. These panels 433, 434 and 435 connect to ware support unit drives 424, 425, 426, it being remembered that both ware supports 203 of one side, on one printing unit, of the machine, are being driven by the same motor drive. As pointed out before, each of these drives consists of a motor 225 and a resolver 226. The printing unit control panels 433, 434 and 435 are also connected to the six squeegee carrier drives 427, 428, 429, 430, 431 and 432. Each of these drives, as indicated before, comprises a motor 325 and a resolver 326 for each of the squeegee carriers 201. Each ware support unit drive 424, 425 and 426 and each squeegee carrier drive 427, 428, 429, 430, 431 and 432 are connected back into the main electric panel 420. This is a mere schematic illustration of a suitable wiring arrangement but other arrangements could be provided.

OPERATION

The decorating machine, as indicated, is a continuous-motion machine. The sequence of operations during high-speed movement of the machine is as follows:

A. Undecorated ware, such as tumblers T, is carried through the spacing screw 56 by the delivery conveyor 55;

B. Spaced ware is delivered to the loader section 52a of the unit 52 by the delivery conveyor 55;

C. The loader section 52a carries the ware from the delivery conveyor 55 to the load and unload lift conveyor 150 and positions it for loading;

D. The load lift mechanism, comprising lift 180 and cam 195a, pushes the ware up to be engaged by the activated vacuum chucks 63 of the respective spindle assemblies 60 which are moving continuously with the ware carrier 50;

E. The spindle assemblies 60 are controlled by cam rail 100 as the carrier 50 moves them toward the first printing section 53, to bring the ware T into horizontal position;

F. At the first printing station 53a, the ware is lifted by the lift unit 205 into engagement with the bottom of the first screen S on the support unit 203, and the ware is properly registered by rack 203a cooperating with registering means 74 on the spindle assembly 60.

G. At substantially the same time the ware is lifted, it is engaged near its bottom end by the ware support unit 202;

H. Also at about this same time as the ware lifting and bottom engagement, the associated squeegee 300 is brought down into contact with the screen S;

I. The ware carrier 50 moves continuously to carry the ware T along and roll it against the bottom of the screen S and, at the same time, the cooperating squeegee 300 is moved continuously by carrier 201 to cause the cam 365 to lower it so it will wipe over the screen to force the paint downwardly through the design thereof;

J. Near the end of the travel over the screen S, the squeegee 300 is lifted out of the screen and excess paint is wiped off by the wiper bars 292;

K. The ware support unit 202 retracts from support of the ware at about the same time and the ware is lowered from printing position by the roller running off the cam 100d;

L. The ware is carried on continuously around the machine by the carrier 50 to the second, third, fourth, fifth and sixth printing stations of the printing units 53 where the above-indicated operations are repeated if this many printing operations are desired;

M. Further movement of the spindle assemblies 60 with the carrier 50 will move the ware into vertical position under control of cam rail 100;

N. The ware is brought in a vertical position continuously into cooperation with the unloading lift conveyor 150 and onto the elevator members 180 which will cooperate with cam 195b to lower the ware, as vacuum is released, to be engaged by the unloader section 52b of unit 52; and O. The unloader 52b will move the ware onto the continuously-moving take-out conveyor 57 which will transfer the ware away from the decorating machine.

P. As indicated above, if any vacuum chuck 63 does not receive an article of ware, the actuator 368 is actuated to position the cam 366a outwardly so that it will be engaged by roller 364 to move the squeege-carrying bracket 347 outwardly and thereby cause the roller 360 to miss the cam 365 so as not to push the squeegee down against the screen.

The screen S is removably supported by the frame 203a and can be removed and replaced. If necessary, the screen can be heated. Excess paint is wiped off the squeegee 300 at the downstream end of the screen by the rods 292 and paint which accumulates at that end is returned to the other end of the screen by the pump 281 through reservoir 281a.

The squeegee is automatically located directly on the centerline of the article to be printed and is carried down against the screen above the article. The squeegee is lowered simultaneously with the ware being lifted into the printing position. The squeegee blade contacts the screen and remains in contact throughout the printing operation. After the printing operation is completed, the squeegee is carried away from the screen. The electronic resolvers associated with the main ware carrier drive, the ware bottom support carrier drive, and the squeegee carrier drive can be controlled so that all centerlines can be properly located and locked. Specifically, this locks the centerline of each squeegee with the centerline of the ware carrier chain spindle and the centerline of the ware support rollers. Furthermore, because the chain of the load and unload conveyor, the chain of the main ware carrier, the chain of the squeegee carrier and the chain of the ware bottom support unit are all provided with the eccentric means for compensating for chordal action, the relative positions of these centerlines can be maintained during the printing operation.

The screen holder assembly supports the screen and the gear rack which engages the spindle gear and rotates the spindle as the printing operation takes place. Disengagement of the gear from the rack properly rotates the ware for accurate registration. As the squeegee moves into printing contact with the screen, the carrier chain moves the ware in a horizontal plane, rotating the spindle to rotate the ware and paint it as it moves along horizontally.

The length of time the successive squeegees are in contact with each screen is adjustable by adjusting the amount of exposed chain cam 365a for that particular unit, which is accomplished by adjusting lever 414.

Vacuum is applied to the spindle chuck at the loading station and is released at the unloading station. If desired, compressed air may be supplied to the chucks through the same vacuum release valves 69 at the unloading station to aid in the ware release.

Different size and shape articles will require different spindle assemblies. The loading and unloading conveyor 150 can be adjusted for different height articles by the screw 163. The cam rail 100 can be adjusted in accordance with the height and diameter of the articles by the screws 97, and screws 211 of the lift unit 205 can be adjusted in accordance with the diameter of the articles. The ware-engagement rollers 215 of unit 202 can be adjusted into proper position in accordance with the size of the articles by means of handwheels 219, to adjust for length of the articles, and clamp means 220 can be released to adjust by the handwheels 223 for diameter of the articles. The position of the squeegee carriers 201 can be adjusted by screws 304 for diameter size and screws 307 for length. The screen S can be adjusted relative on the stretch frame 278. The rack 203a can be adjusted to position it longitudinally properly by releasing and re-engaging the clamping units 302b of the right support arm 276 so that they properly actuate registering units 64 on the spindle assemblies 60.

It will be apparent that this invention provides for a conveyor of the endless chain type passing around two or more sprockets and which is composed of interfitting links pivoted together at pivot axes, the chain consisting of successive links having overlapping ends pivoted together at said axes by pivot or hinge pins which have eccentrics mounted for rocking on said hinge pins. Rocking of the eccentrics is controlled as the links move onto and off the sprockets to change the pitch of each successive link as it moves onto and off the sprocket to compensate for chordal action thereby to keep the speed of the chain runs constant.

Having thus described this invention what is claimed is:

1. A conveyor comprising a chain mounted by means including a plurality of sprockets for movement therearound, said chain being composed of interfitting links pivoted together at pivot axes, eccentrics at said pivot axes having sprocket-engaging surfaces, and means for rocking said eccentrics relative to said axes of the chain as it passes onto and off each sprocket; said rocking means including an oscillatable lever connected to each eccentric, said oscillatable lever being fixed to the eccentric on one link and extending to a transversely mounted slide on the adjacent link to which the lever is connected, said slide extending outwardly from its mounting link at both sides and carrying a cam follower at each side, a cam guide extending along the conveyor for engaging with one of the cam followers and cams adjacent the sprockets for engaging with the other cam follower.

2. A conveyor according to claim 1 in which the slide has the cam followers in the form of guide rollers, one roller cooperating with the cam guide extending along the conveyor and the other roller cooperating with a cam adjacent a sprocket for positioning the slide as it approaches the cam guide so that the other roller will be positioned properly to enter thereinto.

3. A conveyor according to claim 1 in which the chain links have overlapping ends pivoted together by pivot pins and the chain passes around the plurality of sprockets, each of said links having one end pivoted to one pin and the other end carried by an eccentric on the adjacent pin, rocking of said eccentrics varying the distance between adjacent pins.

4. A conveyor according to claim 3 including support and guide rollers on said pivot pins, guides along the conveyor for engaging said rollers, and additional curved guides around the sprockets for engaging said rollers to hold the sprocket-engaging surfaces of the eccentrics in the sprockets.

5. A conveyor comprising a chain formed of interfitting links having overlapping ends pivoted together at pivot axes by transverse hinge pins and passing around sprockets, eccentrics at said pivot axes having sprocket-engaging surfaces, and means for rocking said eccentrics relative to said axes as the chain passes onto and off the sprockets, including a first end of each link pivoted on one hinge pin and a second end pivoted to the next pin which carries one of the eccentrics rotatable on the latter pin but being fixed to that second end of the link so that swinging of the link about that latter hinge pin as it passes onto and off a sprocket rocks the eccentric about that hinge pin.

6. A conveyor according to claim 5 in which the second end of the link and the eccentric are axially adjacent on the hinge pin and are pinned together by a transverse pin.

* * * * *